United States Patent
Sasaki

Patent Number: 6,046,628
Date of Patent: Apr. 4, 2000

[54] DEMODULATING DEVICE COMPRISING A SMALL CIRCUIT AND A SMALL CONSUMPTION POWER

[75] Inventor: Teruo Sasaki, Tokyo, Japan

[73] Assignee: NEC Corporation, Tokyo, Japan

[21] Appl. No.: 09/102,605

[22] Filed: Jun. 23, 1998

[30] Foreign Application Priority Data

Jun. 24, 1997 [JP] Japan .................................. 9-167487

[51] Int. Cl.⁷ .................................................. H03D 3/00
[52] U.S. Cl. ............................ 329/300; 329/303; 375/324
[58] Field of Search ................................... 329/300, 301, 329/302, 303; 375/324, 334, 340, 328

[56] References Cited

U.S. PATENT DOCUMENTS

| | | | |
|---|---|---|---|
| 5,081,650 | 1/1992 | Hasegawa et al. | 375/80 |
| 5,373,533 | 12/1994 | Hayashihara et al. | |
| 5,640,428 | 6/1997 | Abe et al. | |
| 5,724,001 | 3/1998 | Chang | 329/302 |

FOREIGN PATENT DOCUMENTS

| | | |
|---|---|---|
| 59-196629 | 11/1984 | Japan . |
| 60-100859 | 6/1985 | Japan . |
| 63-233636 | 9/1988 | Japan . |
| 3-44246 | 2/1991 | Japan . |
| 4-2216 | 1/1992 | Japan . |
| 4-137927 | 5/1992 | Japan . |
| 4-227339 | 8/1992 | Japan . |
| 5-130158 | 5/1993 | Japan . |
| 5-191463 | 7/1993 | Japan . |
| 6-78227 | 3/1994 | Japan . |
| 6-152464 | 5/1994 | Japan . |
| 6-315037 | 11/1994 | Japan . |
| 8-107428 | 4/1996 | Japan . |
| 8-204765 | 8/1996 | Japan . |
| 8-288879 | 11/1996 | Japan . |
| 9-148882 | 6/1997 | Japan . |

OTHER PUBLICATIONS

Japanese Office Action dated Jun. 29, 1999, with partial translation.
British Search Report dated Feb. 11, 1999.

*Primary Examiner*—Benny Lee
*Assistant Examiner*—Henry Choe
*Attorney, Agent, or Firm*—McGinn & Gibb, P.C.

[57] ABSTRACT

In a demodulating device which comprises an orthogonal transforming circuit, an up-converting circuit, a pulse signal producing circuit, and a low-pass filter, the orthogonal transforming circuit orthogonally transforms a received frequency shift keying signal to produce a first base band signal and a second base band signal. A phase converting circuit converts a clock signal from a clock signal producing circuit to produce a first clock signal having a first phase and a second clock signal having a second phase. A first EXOR circuit receives the first base band signal and the first clock signal to produce a first EXOR output signal. A second EXOR circuit receives the second base band signal and the second clock signal to produce a second EXOR output signal. A mixing circuit mixes the first EXOR output signal and the second EXOR output signal to produce and supply an up-converted signal to the pulse signal producing circuit.

20 Claims, 20 Drawing Sheets

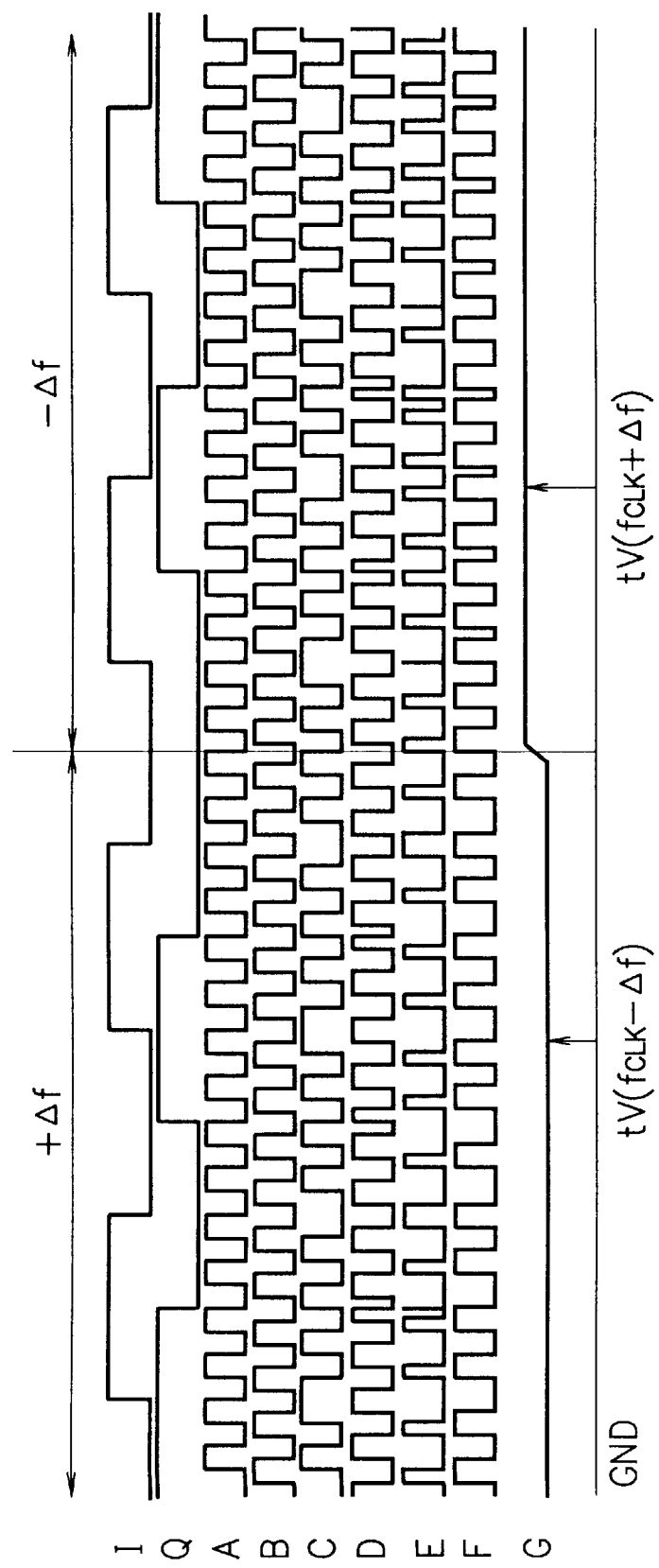

DEMODULATING DEVICE COMPRISING A SMALL CIRCUIT AND A SMALL CONSUMPTION POWER

BACKGROUND OF THE INVENTION

This invention relates to a demodulating device, and more particularly to a demodulating device for mixing up base band signals.

DESCRIPTION OF THE PRIOR ART

Recently, demand of mobile communication devices is rapidly increased. Therefore, in FSK communication device for using frequency shift keying signal, accelerating of transfer speed and multi-level transmission of data are requested.

As a first conventional demodulating device of the type, a direct conversion FSK communication device having D flip-flops is generally known. The direct conversion FSK communication device has a disadvantage that frequency of operation of detecting phase is decreased and capacity of demodulation is decreased when transfer speed of data is increased. Also, the direct conversion FSK communication device has a disadvantage that the direct conversion FSK communication device is difficult capability of accommodating multi-level transmission because the direct conversion FSK communication device is incapable of judging size of frequency deviation.

In order to solve the disadvantages of the direct conversion FSK communication device, there is provided a second conventional demodulating device. In the manner which will be later described in detail, the second conventional demodulating device comprises an up-converting circuit which converts a frequency of a base band signal to produce an up-converted signal having an intermediate frequency. Thereby, the second conventional demodulating device is capable of increasing a frequency of detecting phase. Thereafter, the second conventional demodulating device produces, in response to the up-converted signal, a signal having a voltage.

A third conventional demodulating device is disclosed in Japanese Unexamined Patent Prepublication (koukai) No. 152464/1994. The third conventional demodulating device comprises an up-converting circuit having an analog circuit which is same to the up-converting circuit of the second conventional demodulating device.

A fourth conventional demodulating device is disclosed in Japanese Unexamined Patent Prepublication (koukai) No. 78227/1994. The fourth conventional demodulating device comprises an up-converting circuit having an analog circuit which is same to the up-converting circuit of the second conventional demodulating device.

A fifth conventional demodulating device is disclosed in Japanese Unexamined Patent Prepublication (koukai) No. 288879/1996. The fifth conventional demodulating device comprises an up-converting circuit having an analog circuit which is same to the up-converting circuit of the second conventional demodulating device.

A sixth conventional demodulating device is disclosed in Japanese Unexamined Patent Prepublication (koukai) No. 227339/1992. The sixth conventional demodulating device comprises an up-converting circuit having an analog circuit which is same to the up-converting circuit of the second conventional demodulating device.

However, each of the second through the sixth conventional demodulating devices comprises the up-converting circuit having the analog circuit. Also, as in each of the second through the sixth conventional demodulating devices, the up-converting circuit receives an input signal having an intermediate frequency, it is impossible to decrease a size of the up-converting circuit. As a result, each of the second through the sixth conventional demodulating devices comprises a great circuit.

SUMMARY OF THE INVENTION

It is therefore an object of this invention to provide a demodulating device which comprises a small circuit and a small consumption power.

It is therefore another object of this invention to provide a demodulating device which is suited for integration of a circuit.

Other objects of this invention will become clear as the description proceeds.

According to this invention, there is provided a demodulating device which comprises an orthogonal transforming circuit, an up-converting circuit, a pulse signal producing circuit, and a low-pass filter, the orthogonal transforming circuit being for orthogonally transforming a received frequency shift keying signal to produce a first base band signal and a second base band signal, the up-converting circuit being connected to the orthogonal transforming circuit and for mixing the first base band signal and the second base band signal to a mixed signal as an up-converted signal, the pulse signal producing circuit being connected to up-converting circuit and for producing a pulse signal in response to the up-converted signal, the low-pass filter being connected to the pulse signal producing circuit for filtering the pulse signal to produce a filtered signal as a demodulated signal, the up-converting circuit comprising;

a clock signal producing circuit for producing a clock signal;

a phase converting circuit connected to the clock signal producing circuit for converting the clock signal to produce a first clock signal having a first phase and a second clock signal having a second phase;

a first EXOR circuit connected to the orthogonal transforming circuit and to the phase converting circuit for receiving the first base band signal and the first clock signal to produce a first EXOR output signal;

a second EXOR circuit connected to the orthogonal transforming circuit and to the phase converting circuit for receiving the second base band signal and the second clock signal to produce a second EXOR output signal; and a mixing circuit connected to the first EXOR circuit and to the second EXOR circuit for mixing the first EXOR output signal and the second EXOR output signal to produce the up-converted signal.

BRIEF DESCRIPTION OF THE DRAWINGS

FIG. 20 is a timing chart of signals for describing an operation of the demodulating device illustrated in FIG. 19.

DESCRIPTION OF THE PREFERRED EMBODIMENTS

Figure 1:
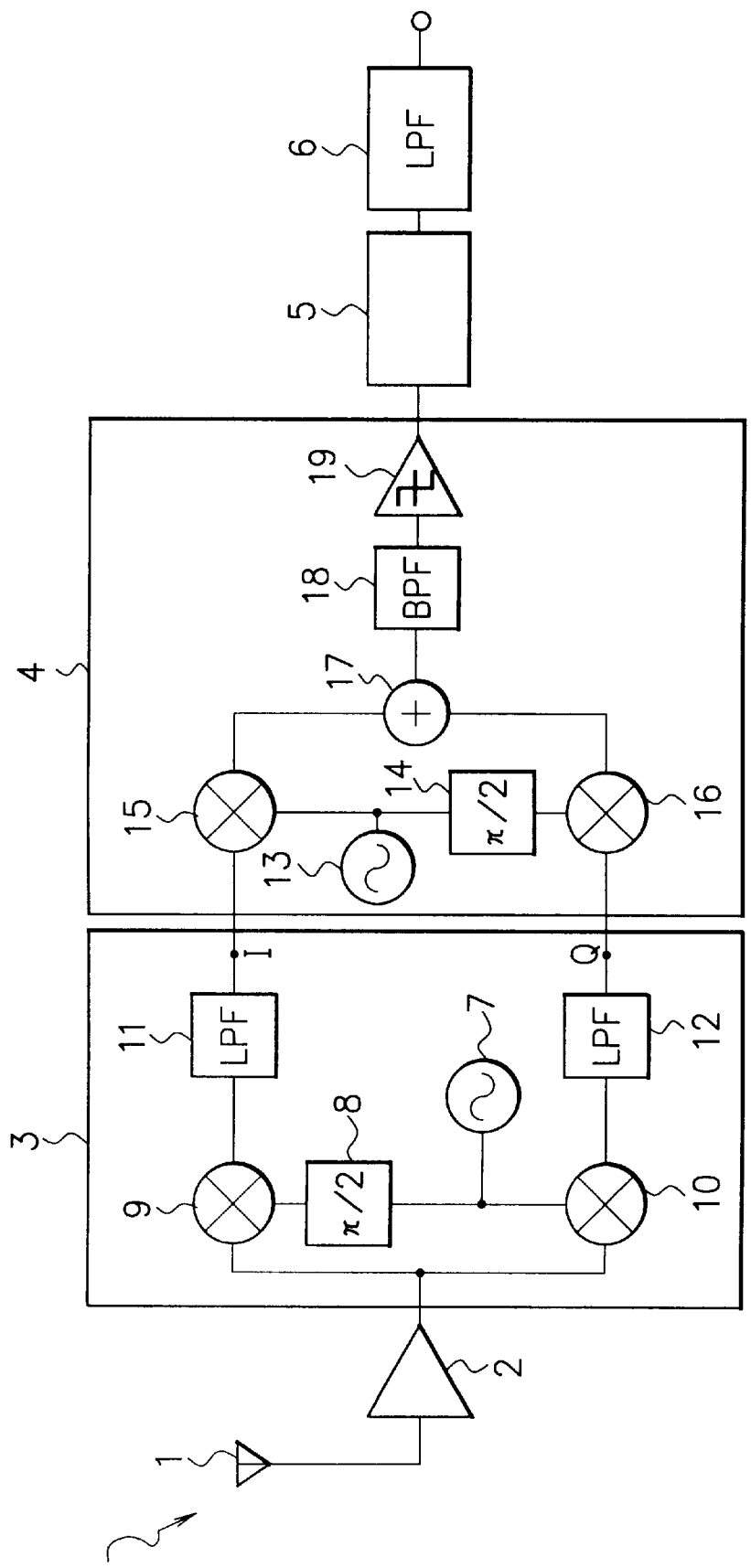
FIG. 1 is a block diagram of a conventional demodulating device.

Referring to FIG. 1, a conventional demodulating device will be described for a better understanding of this invention. The conventional demodulating device comprises an antenna 1, a high frequency amplifier 2, an orthogonal transforming circuit 3, an up-converting circuit 4, a pulse signal producing circuit 5, and a main low-pass filter 6. The high frequency amplifier 2 is connected to the antenna 1. The orthogonal transforming circuit 3 is connected to the high frequency amplifier 2. The up-converting circuit 4 is connected to the orthogonal transforming circuit 3. The pulse signal producing circuit 5 is connected to the up-converting circuit 4. The mainlow-pass filter 6 is connected to the pulse signal producing circuit 5.

The antenna 1 is supplied with a frequency shift keying signal and sends the frequency shift keying signal to the high frequency amplifier 2. The high frequency amplifier 2 is supplied with the frequency shift keying signal from the antenna 1. The high frequency amplifier 2 amplifies the frequency shift keying signal to produce an amplified frequency shift keying signal as a received frequency shift keying signal.

The orthogonal transforming circuit 3 comprises a first local oscillator 7, a first phase shifter 8, a first mixer 9, a second mixer 10, a first low-pass filter 11, and a second low-pass filter 12. The first phase shifter 8 is connected to the first local oscillator 7. The first mixer 9 is connected to the high frequency amplifier 2 and to the first phase shifter 8. The second mixer 10 is connected to the high frequency amplifier 2 and to the first local oscillator 7. The first low-pass filter 11 is connected to the first mixer 9. The second low-pass filter 12 is connected to the second mixer 10.

The first local oscillator 7 produces a first oscillation signal. The first phase shifter 8 is supplied with the first oscillation signal. The first phase shifter 8 shifts the first oscillation signal by $\pi/2$ to produce a first shifted oscillation signal. The first mixer 9 is supplied with the received frequency shift keying signal from the high frequency amplifier 2. Also, the first mixer 9 is supplied with the first shifted oscillation signal from the first phase shifter 8. The first mixer 9 mixes the received frequency shift keying signal and the first shifted oscillation signal to produce a first mixed frequency shift keying signal. The second mixer 10 is supplied with the received frequency shift keying signal from the high frequency amplifier 2. Also, the second mixer 10 is supplied with the first oscillation signal from the first local oscillator 7. The second mixer 10 mixes the received frequency shift keying signal and the first oscillation signal to produce a second mixed frequency shift keying signal.

The first low-pass filter 11 is supplied with the first mixed frequency shift keying signal from the first mixer 9. The first low-pass filter 11 filters the first mixed frequency shift keying signal to produce a first base band signal I. The second low-pass filter 12 is supplied with the second mixed frequency shift keying signal from the second mixer 10. The second low-pass filter 12 filters the second mixed frequency shift keying signal to produce a second base band signal Q.

The up-converting circuit 4 comprises a second local oscillator 13, a second phase shifter 14, a third mixer 15, a fourth mixer 16, a subtracter 17, a band pass filter 18, and a limiter amplifier 19. The second phase shifter 14 is connected to the second local oscillator 13. The third mixer 15 is connected to the first low-pass filter 11 and to the second local oscillator 13. The fourth mixer 16 is connected to the second low-pass filter 12 and to the second phase shifter 14. The subtracter 17 is connected to the third mixer 15 and to the fourth mixer 16. The band pass filter 18 is connected to the subtracter 17. The limiter amplifier 19 is connected to the band pass filter 18 and to the pulse signal producing circuit 5.

The second local oscillator 13 produces a second oscillation signal. The second phase shifter 14 is supplied with the second oscillation signal. The second phase shifter 14 shifts the second oscillation signal by $\pi/2$ to produce a second shifted oscillation signal. The third mixer 15 is supplied with the first base band signal I from the first low-pass filter 11. Also, the third mixer 15 is supplied with the second oscillation signal from the second local oscillator 13. The third mixer 15 mixes the first base band signal I and the second oscillation signal to produce a third mixed base band signal. The fourth mixer 16 is supplied with the second base band signal Q from the second low-pass filter 12. Also, the fourth mixer 16 is supplied with the second shifted oscillation signal from the second phase shifter 14. The fourth mixer 16 mixes the second base band signal Q and the second shifted oscillation signal to produce a fourth mixed base band signal.

The subtracter 17 is supplied with the third mixed base band signal from the third mixer 15 and the fourth mixed base band signal from the fourth mixer 16. The subtracter 17 subtracts the fourth mixed base band signal from the third mixed base band signal to produce a subtracted base band signal. The band pass filter 18 is supplied with the subtracted base band signal from the subtracter 17. The band pass filter 18 filters the subtracted base band signal to produce a filtered base band signal. The limiter amplifier 19 is supplied with the filtered base band signal from the band pass filter 18. The limiter amplifier 19 amplifies the filtered base band signal to produce an amplified base band signal as an up-converted signal.

The pulse signal producing circuit 5 is supplied with the up-converted signal from the limiter amplifier 19. The pulse producing circuit 5 produces, in response to the up-converted signal, a pulse signal having a frequency. The main low-pass filter 6 is supplied with the pulse signal having the frequency from the pulse signal producing circuit 5. The main low-pass filter 6 filters the pulse signal to produce a filtered signal as a demodulated signal which has a voltage corresponding to the frequency of the pulse signal.

It is assumed that a carrier frequency of the frequency shift keying signal is represented by $\omega/2\pi$ and a phase deviation of the frequency shift keying signal is represented by $\pm\Delta\omega/2\pi$, the frequency shift keying signal is represented by $\cos(\omega\pm\Delta\omega)t$. In this event, it is assumed that the first local oscillation signal of the first local oscillator 7 is represented by $\sin \omega t$. It is assumed that the first mixed frequency shift keying signal of the first mixer 9 is represented by M1, M1 is represented by a following equation (1).

$$M1 = \cos(\omega \pm \Delta\omega)t \cos\omega t \quad (1)$$
$$= (1/2)[\cos(\omega \pm \Delta\omega + \omega)t + \cos(\omega \pm \Delta\omega - \omega)t]$$
$$= (1/2)[\cos(2\omega \pm \Delta\omega)t + \cos(\pm\Delta\omega t)]$$

Here, as $2\omega\pm\Delta\omega$ is great, $\cos(2\omega\pm\Delta\omega)$ is excluded by the first low-pass filter 11. Therefore, M1 is represented by a following equation (2).

$$M1 = (½)\cos(\Delta\omega t) \quad (2)$$

It is assumed that the second mixed frequency shift keying signal of the first mixer 10 is represented by M2, M2 is represented by a following equation (3).

$$M2 = \cos(\omega \pm \Delta\omega)t \sin\omega t \quad (3)$$
$$= (1/2)[\sin(\omega \pm \Delta\omega + \omega)t + \sin(\omega \pm \Delta\omega - \omega)t]$$
$$= (1/2)[\sin(2\omega \pm \Delta\omega)t + \sin(\pm\Delta\omega t)]$$

Here, as $(2\omega\pm\Delta\omega)$ is great, $\sin(2\omega\pm\Delta\omega)$ is excluded by the second low-pass filter 12. Therefore, M2 is represented by a following equation (4).

$$M2 = (½)\sin(\Delta\omega t) \quad (4)$$

In this event, it is assumed that the second oscillation signal of the second local oscillator 13 is represented by $\sin \omega 2\, t$. Also, it is assumed that the up-converted signal of the up-converting circuit 4 is represented by VOUT, VOUT is represented by a following equation (5).

$$VOUT=(½)[\cos(\Delta\omega t)\sin \omega 2\, t]\pm(½)[\sin(\Delta\omega t)\cos \omega 2\, t]=(½)[\sin(\omega 2\pm\Delta\omega)] \quad (5)$$

As a result, the first and second base band signals I and Q are converted to a signal which has an intermediate frequency of $\omega 2/2\pi$ as a center and a frequency deviation of $\pm\Delta\omega/2\pi$.

Here, the description will be made as regards an operation of the third mixer 15 and the fourth mixer 16 are supplied with rectangular pulses. In case that the third mixer 15 and the fourth mixer 16 are supplied with the rectangular pulses, the equations (2) and (4) are presented, by Fourier transformation, by following equations (6) and (7), respectively.

$$M1=k[\cos(\Delta\omega t)+(⅓)\cos(3\Delta\omega t)+(⅕)\cos(3\Delta\omega t)+\ldots] \quad (6)$$

$$M2=k[\sin(\Delta\omega t)+(⅓)\sin(3\Delta\omega t)+(⅕)\sin(3\Delta\omega t)+\ldots] \quad (7)$$

In this event, it is assumed that the up-converted signal of the up-converting circuit 4 is represented by VOUT', VOUT' is represented by a following equation (8).

$$VOUT'=k[\sin(\omega 2\pm\Delta\omega)t+(⅓)\sin 3(\omega 2\pm\Delta\omega)t+(⅕)\sin 5(\omega 2\pm\Delta\omega)t+\ldots] \quad (8)$$

As a result, the third mixer 15 and the fourth mixer 16 are able to accommodate with the rectangular pulses.

Figure 2:
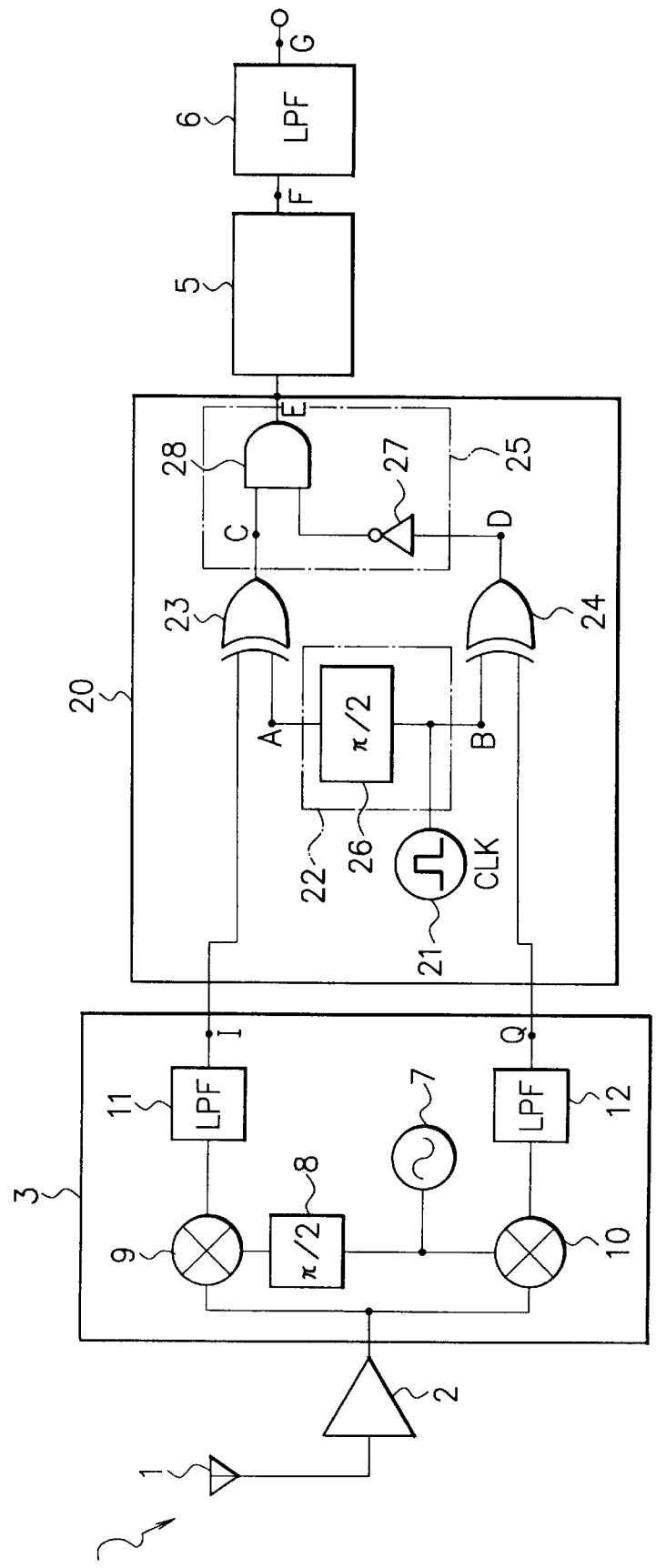
FIG. 2 is a block diagram of a demodulating device according to a first embodiment of this invention.
Figure 3:
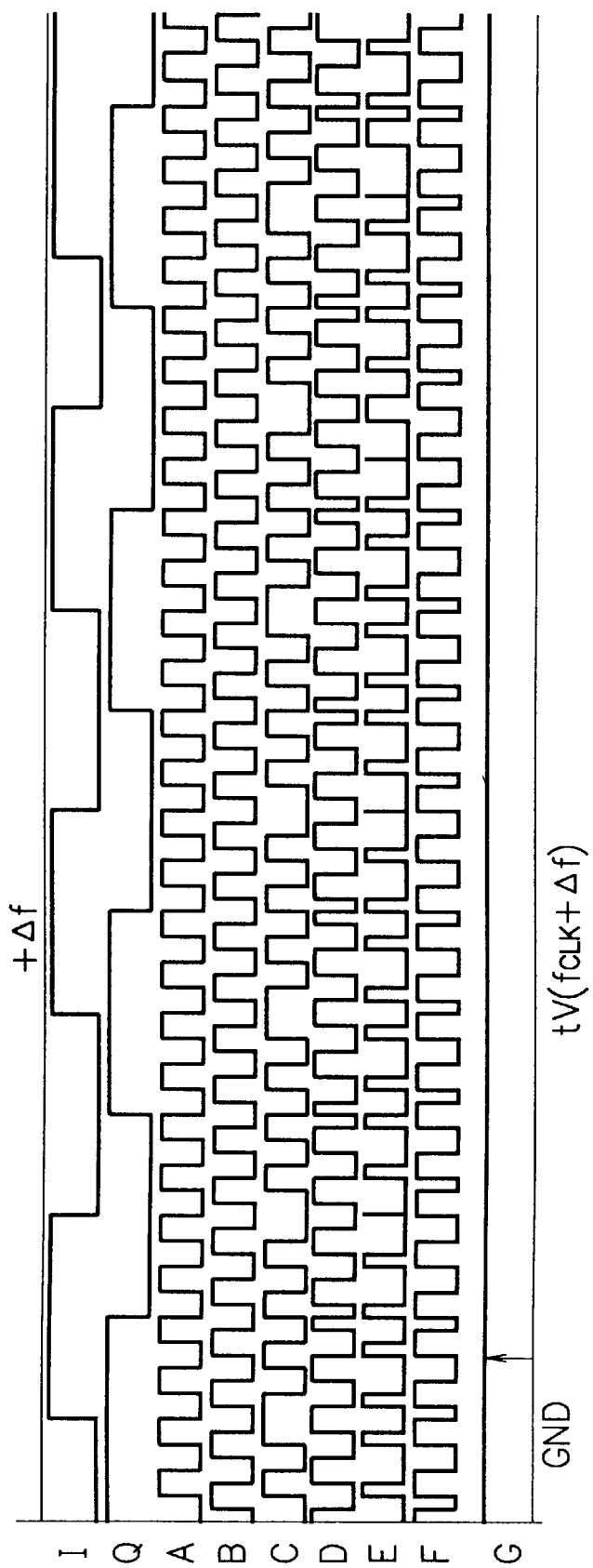
FIG. 3 is a timing chart of signals for describing an operation of the demodulating device illustrated in FIG. 2.
Figure 4:
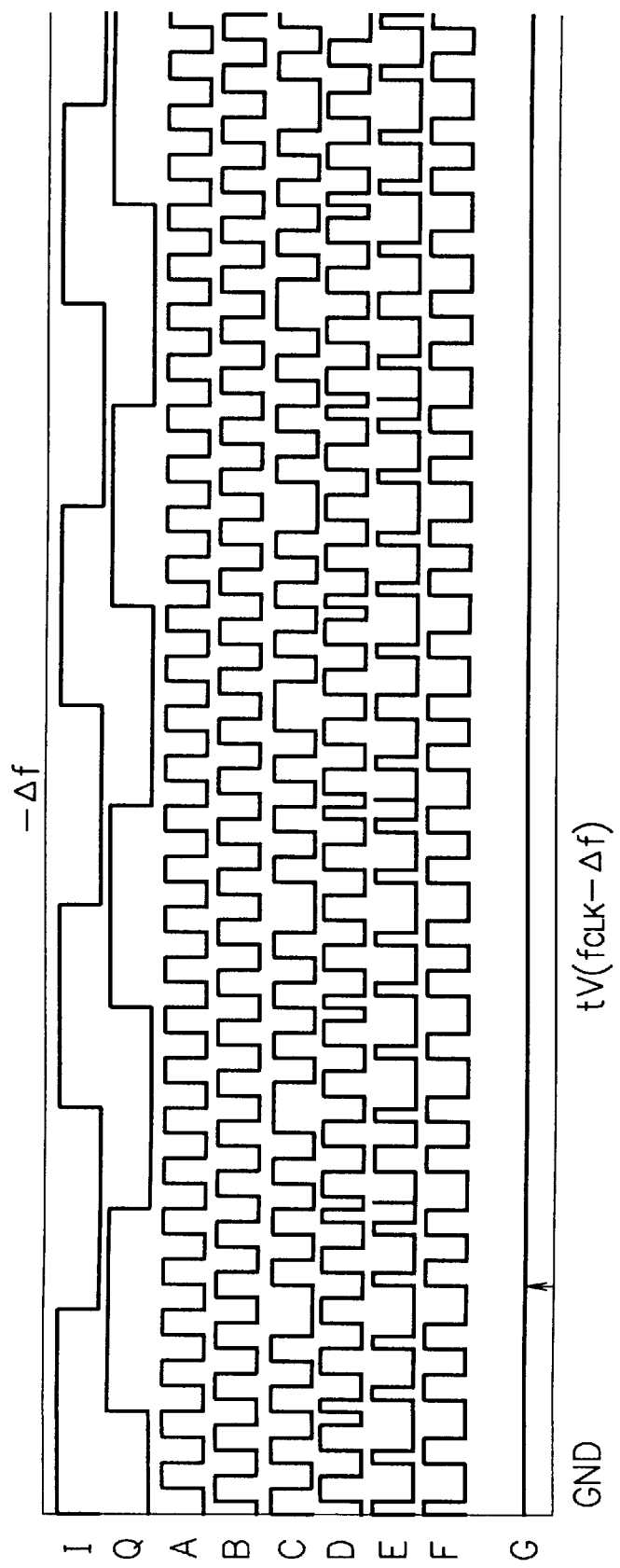
FIG. 4 is another timing chart of signals for describing the operation of the demodulating device illustrated in FIG. 2.

Referring to FIGS. 2, 3, and 4, the description will proceed to a demodulating device according to a first embodiment of this invention. Similar parts are designated by like reference numerals. The demodulating device comprises the antenna 1, the high frequency amplifier 2, the orthogonal transforming circuit 3, an up-converting circuit 20, the pulse producing signal circuit 5, and the main low-pass filter 6. The up-converting circuit 20 is connected to the orthogonal transforming circuit 3. The pulse signal producing circuit 5 is connected to the up-converting circuit 4. The orthogonal transforming circuit 3 comprises the first local oscillator 7, the first phase shifter 8, the first mixer 9, the second mixer 10, the first low-pass filter 11, and the second low-pass filter 12.

The up-converting circuit 20 comprises a clock signal producing circuit 21, a phase converting circuit 22, a first EXOR circuit 23, a second EXOR circuit 24, and a mixing circuit 25. The phase converting circuit 22 is connected to the clock signal producing circuit 21. The first EXOR circuit 23 is connected to the first low-pass filter 11 and to phase converting circuit 22. The second EXOR circuit 24 is connected to the second low-pass filter 12 and to phase converting circuit 22. The mixing circuit 25 is connected to the first EXOR circuit 23, to the second EXOR circuit 24, and to the pulse signal producing circuit 5.

The phase converting circuit 22 comprises a third phase shifter 26 which is connected between the clock signal producing circuit 21 and the first EXOR circuit 23. The second EXOR circuit 24 is connected to the clock signal producing circuit 21. The mixing circuit 25 comprises a NOT circuit 27 (also called an inverter) and an AND circuit 28. The NOT circuit 27 is connected between the second EXOR circuit 24 and the AND circuit 28. The AND circuit 28 is connected to the first EXOR circuit 23, to the NOT circuit 27, and to the pulse signal producing circuit 5.

The clock signal producing circuit 21 produces a clock signal. The third phase shifter 26 is supplied with the clock signal from the clock signal producing circuit 21. The third phase shifter 26 shifts a phase of the clock signal by $\pi/2$ to produce a shifted clock signal as a first clock signal. The third phase shifter 26 supplies the first clock signal to the first EXOR circuit 23. The clock signal producing circuit 21 supplies the clock signal, as a second clock signal to the second EXOR circuit 24. Namely, the phase converting circuit 22 receives the clock signal from the clock signal producing circuit 21 and supplies the clock signal as the second clock signal to the second EXOR circuit 24. The first clock signal has a first phase. The second clock signal has a second phase which is different from the first phase.

The first EXOR circuit 23 is supplied with the first base band signal I from the first low-pass filter 11 and the first clock signal from the third phase shifter 26 to produce a first EXOR output signal. The second EXOR circuit 24 is supplied with the second base band signal Q from the second low-pass filter 12 and the second clock signal from the phase converting circuit 22 to produce a second EXOR output signal.

The NOT circuit 27 is supplied with the second EXOR output signal from the second EXOR circuit 24. The NOT circuit 27 inverts the second EXOR output signal to produce an inverted second EXOR output signal. The AND circuit 28 is supplied with the first EXOR output signal from the first EXOR circuit 23 and the inverted second EXOR output signal from the NOT circuit 27 to produce the up-converted signal. The AND circuit 28 supplies the up-converted signal to the pulse signal producing circuit 5.

As shown in FIG. 2, it is assumed that the clock signal is represented by CLK, the first clock signal is represented by A, the second clock signal is represented by B, the first EXOR output signal is represented by C, the second EXOR output signal is represented by D, the up-converted signal is represented by E, the pulse signal is represented by F, and the demodulated signal is represented by G.

For example, the signals I, Q, CLK, A, B, C, D, E, F, and G are represented as shown in FIGS. 3 and 4. FIG. 3 shows that a frequency deviation is equal to +Δf. FIG. 4 shows that a frequency deviation is equal to −Δf. In this event, a frequency of the pulse signal F of the pulse signal producing circuit 5 is equal to fCLK +Δf in case that the frequency deviation is equal to +Δf. Also, the frequency of the pulse signal F of the pulse signal producing circuit 5 is equal to fCLK −Δf in case that the frequency deviation is equal to −Δf.

It is assumed that an intermediate frequency in time of up-conversion is equal to fCLK, a constant pulse width of the pulse signal F of the pulse signal producing circuit 5 is equal to t, and the pulse signal F of the pulse signal producing circuit 5 is produced only at the time of rising or falling of the up-converted signal E. The demodulated signal G of the main low-pass filter 6 is represented by a following equation (9).

$$G = tV(fCLK \, \Delta f) \quad (9)$$

As a result, the demodulating device is capable of increasing a frequency of detecting a phase of the received signal in a time. Therefore, the demodulating device is capable of increasing a speed of demodulation operation of the received signal.

For example, in case that the frequency shift keying signal has four values, the frequency deviation has Δf and Δf'. In this event, the pulse signal F of the pulse signal producing circuit 5 is up-converted to fCLK Δf and fCLK Δf'. The demodulated signal G of the main low-pass filter 6 produces the demodulated signal G which has voltages corresponding to the pulse signal F having four frequency deviations. Thus, the demodulating device is capable of accommodating multi-level transmission.

In addition, the demodulating device comprise the up-converting circuit 20 which has a few simple logical gate circuits. Therefore, the demodulating device comprises a small circuit and a small consumption power. Also, the demodulating device is suited for integration of circuit.

Figure 5:
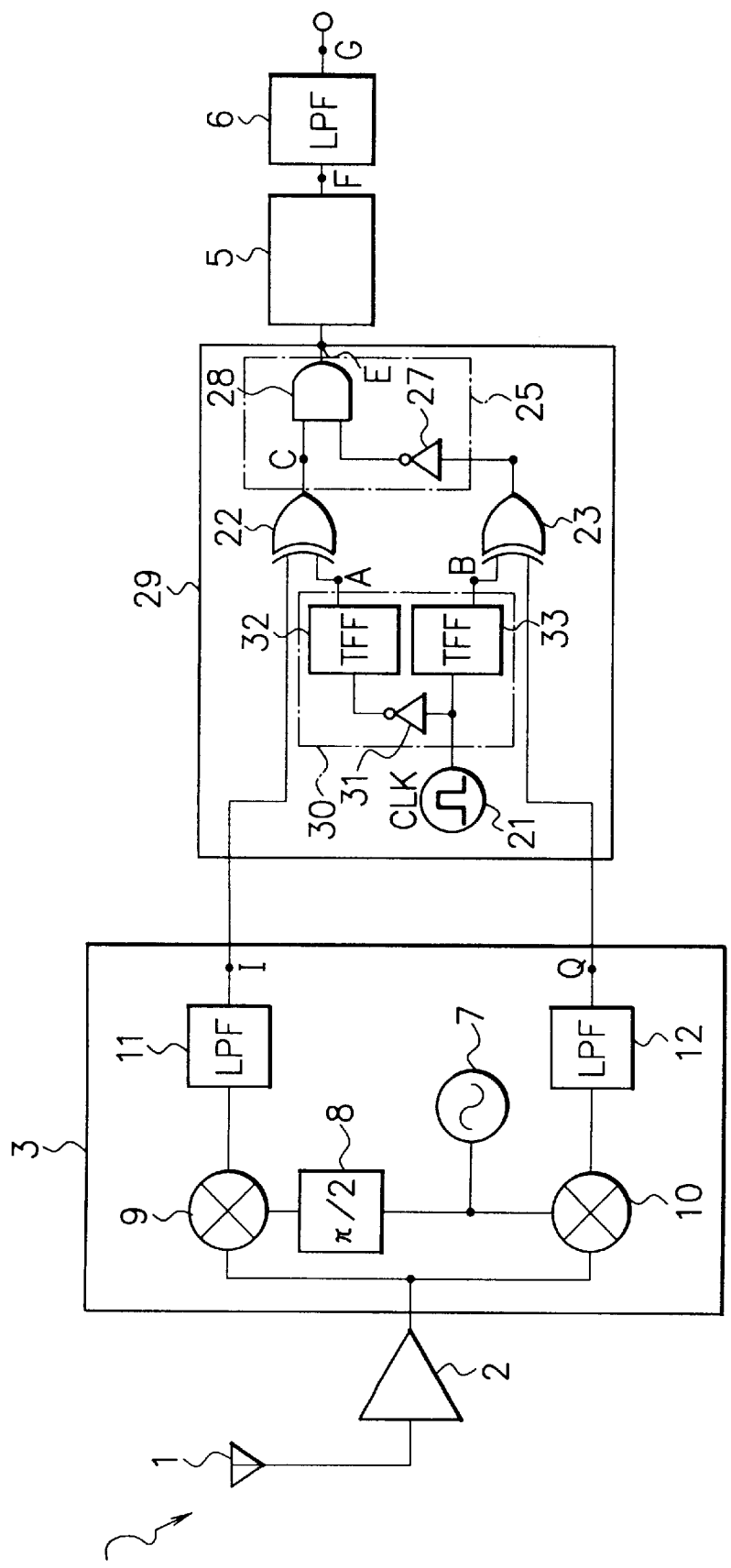
FIG. 5 is a block diagram of a demodulating device according to a second embodiment of this invention.
Figure 6:
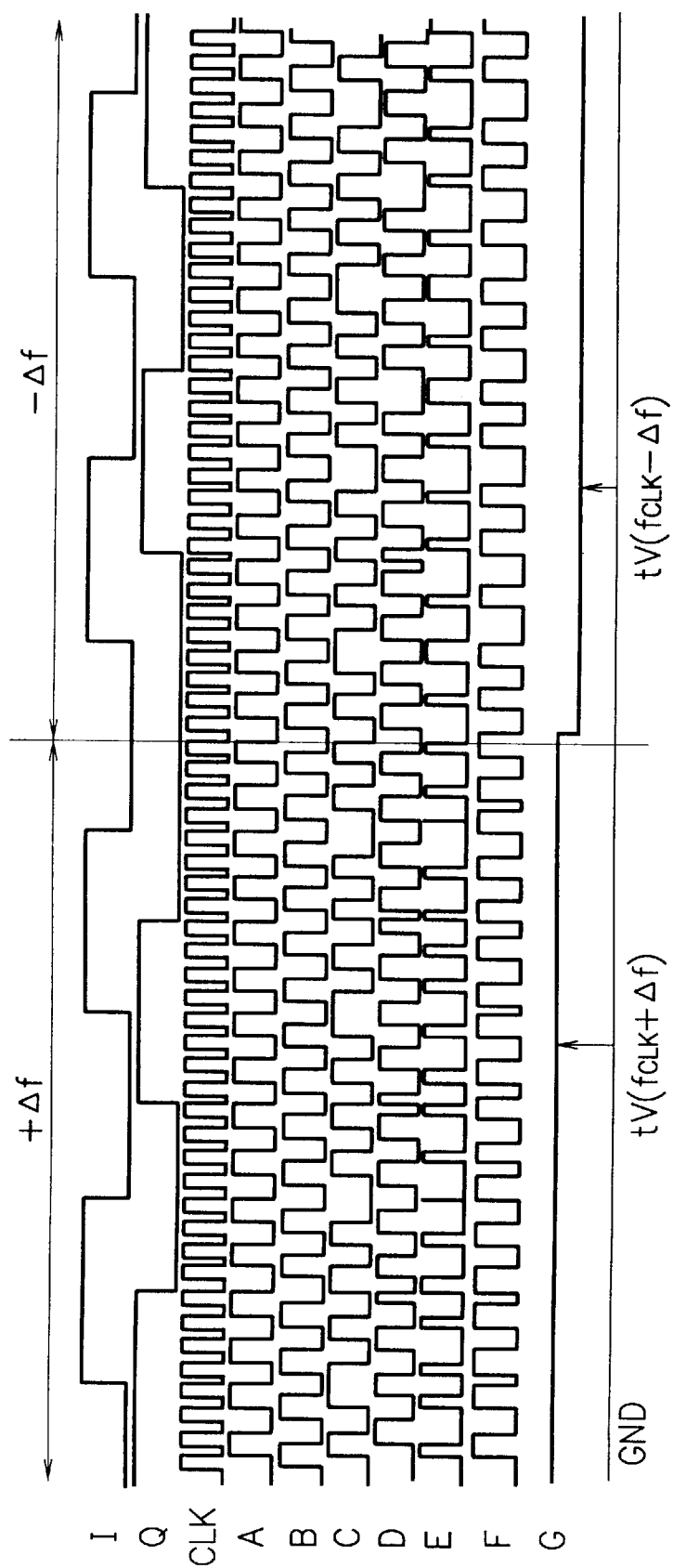
FIG. 6 is a timing chart of signals for describing an operation of the demodulating device illustrated in FIG. 5.

Referring to FIGS. 5 and 6, the description will proceed to a demodulating device according to a second embodiment of this invention. Similar parts are designated by like reference numerals. The demodulating device comprises the antenna 1, the high frequency amplifier 2, the orthogonal transforming circuit 3, an up-converting circuit 29, the pulse signal producing circuit 5, and the main low-pass filter 6.

The up-converting circuit 29 is connected to the orthogonal transforming circuit 3. The pulse signal producing circuit 5 is connected to the up-converting circuit 29. The orthogonal transforming circuit 3 comprises the first local oscillator 7, the first phase shifter 8, the first mixer 9, the second mixer 10, the first low-pass filter 11, and the second low-pass filter 12.

The up-converting circuit 29 comprises the clock signal producing circuit 21, a phase converting circuit 30, the first EXOR circuit 23, the second EXOR circuit 24, and the mixing circuit 25. The phase converting circuit 22 is connected to the clock signal producing circuit 21. The first EXOR circuit 23 is connected to the first low-pass filter 11 and to phase converting circuit 30. The second EXOR circuit 24 is connected to the second low-pass filter 12 and to phase converting circuit 30.

The phase converting circuit 30 comprising a NOT circuit 31, a first T flip-flop 32, and a second T flip-flop 33. The NOT circuit 31 is connected between the clock signal producing circuit 21 and the first EXOR circuit 23. The NOT circuit 31 is supplied with the clock signal from the clock signal producing circuit 21. The NOT circuit 31 inverts the clock signal to produce an inverted clock signal. The first T flip-flop 32 is connected between the NOT circuit 31 and the first EXOR circuit 32. The first T flip-flop 32 is supplied with the inverted clock signal from the NOT circuit 31. The first T flip-flop 32 divides, by ½, the inverted clock signal and shifts, by π/4, the inverted clock signal to produce the first clock signal. The second T flip-flop 33 is connected between the clock signal producing circuit 21 and the second EXOR circuit 24. The second T flip-flop 33 is supplied with the clock signal from the clock signal producing circuit 21. The second T flip-flop 33 divides, by ½, the clock signal and shifts, by −π/4, the the clock signal to produce the second clock signal. The first and second T flip-flops 32 and 33 supply the first and second clock signals to the first and second EXOR circuits 23 and 24, respectively.

As shown in FIG. 5, it is assumed that the clock signal is represented by CLK, the first clock signal is represented by A, the second clock signal is represented by B, the first EXOR output signal is represented by C, the second EXOR output signal is represented by D, the up-converted signal is represented by E, the pulse signal is represented by F, and the demodulated signal is represented by G.

For example, the signals I, Q, CLK, A, B, C, D, E, F, and G are represented as shown in FIG. 6. A left section of FIG. 6 shows that a frequency deviation is equal to +Δf. A right section of FIG. 6 shows that a frequency deviation is equal to −Δf.

Figure 7:
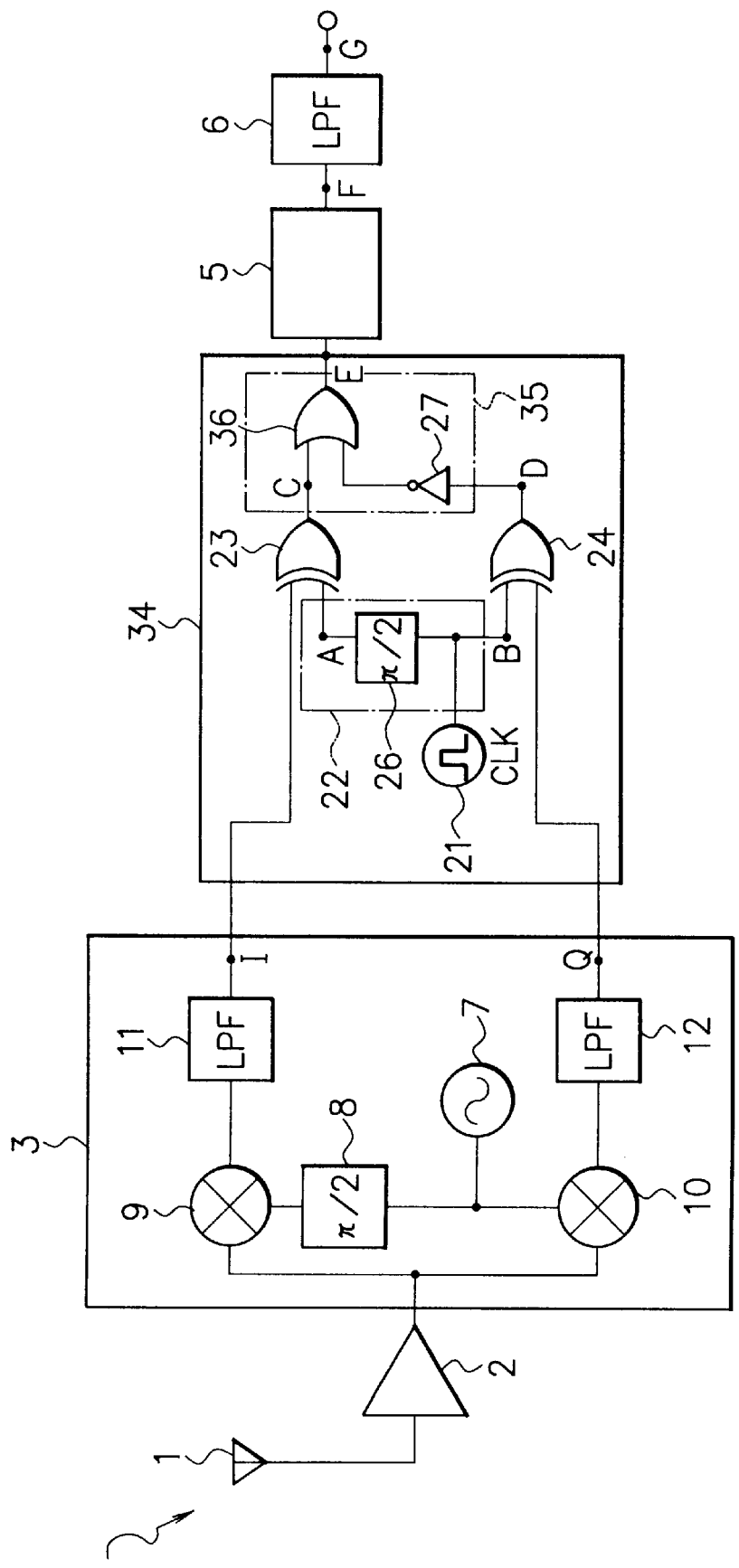
FIG. 7 is a block diagram of a demodulating device according to a third embodiment of this invention.
Figure 8:
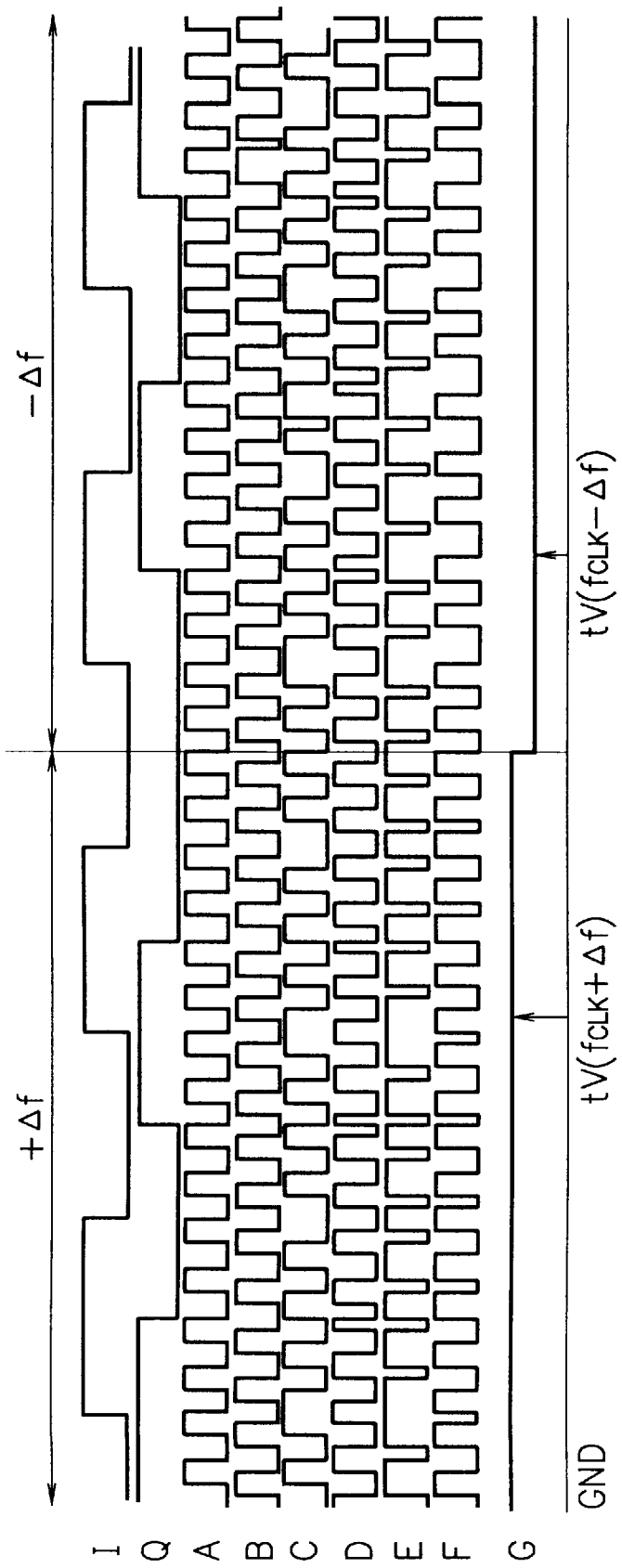
FIG. 8 is a timing chart of signals for describing an operation of the demodulating device illustrated in FIG. 7.

Referring to FIGS. 7 and 8, the description will proceed to a demodulating device according to a third embodiment of this invention. Similar parts are designated by like reference numerals. The demodulating device comprises the antenna 1, the high frequency amplifier 2. the orthogonal transforming circuit 3, an up-converting circuit 34, the pulse signal producing circuit 5, and the main low-pass filter 6. The up-converting circuit 34 is connected to the orthogonal transforming circuit 3. The pulse signal producing circuit 5 is connected to the up-converting circuit 34. The orthogonal transforming circuit 3 comprises the first local oscillator 7, the first phase shifter 8, the first mixer 9, the second mixer 10, the first low-pass filter 11, and the second low-pass filter 12.

The up-converting circuit 34 comprises the clock signal producing circuit 21, the phase converting circuit 22, the first EXOR circuit 23, the second EXOR circuit 24, and a mixing circuit 35. The phase converting circuit 22 is connected to the clock signal producing circuit 21. The first EXOR circuit 23 is connected to the first low-pass filter 11 and to phase converting circuit 22. The second EXOR circuit 24 is connected to the second low-pass filter 12 and to phase converting circuit 22.

The mixing circuit 35 comprises the NOT circuit 27 and an OR circuit 36. The NOT circuit 27 is connected to the second EXOR circuit 24. The NOT circuit 27 inverts the second EXOR output signal to produce an inverted second EXOR output signal. The OR circuit 36 is connected to the first EXOR circuit 23, to the NOT circuit 27, and to the pulse signal producing circuit 5. The OR circuit 36 is supplied with the first EXOR output signal and the inverted second EXOR output signal to produce the up-converted signal. The OR circuit 36 supplies the up-converted signal to the pulse signal producing circuit 5.

As shown in FIG. 7, it is assumed that the clock signal is represented by CLK, the first clock signal is represented by A, the second clock signal is represented by B, the first EXOR output signal is represented by C, the second EXOR output signal is represented by D, the up-converted signal is represented by E, the pulse signal is represented by F, and the demodulated signal is represented by G.

For example, the signals I, Q, CLK, A, B, C, D, E, D, F, and G are represented as shown in FIG. 8. A left section of FIG. 8 shows that a frequency deviation is equal to +Δf. A right section of FIG. 8 shows that a frequency deviation is equal to −Δf.

Figure 9:
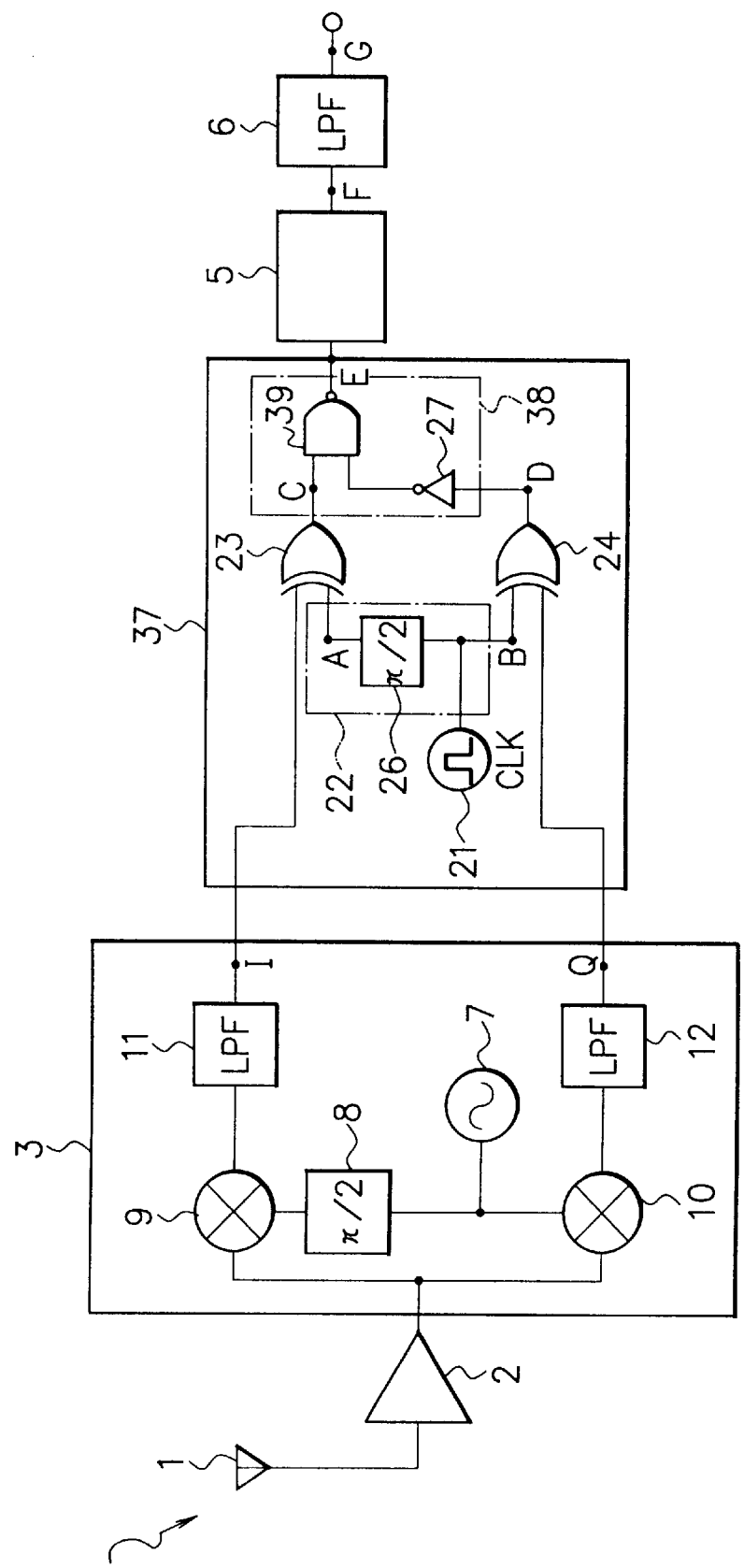
FIG. 9 is a block diagram of a demodulating device according to a fourth embodiment of this invention.
Figure 10:
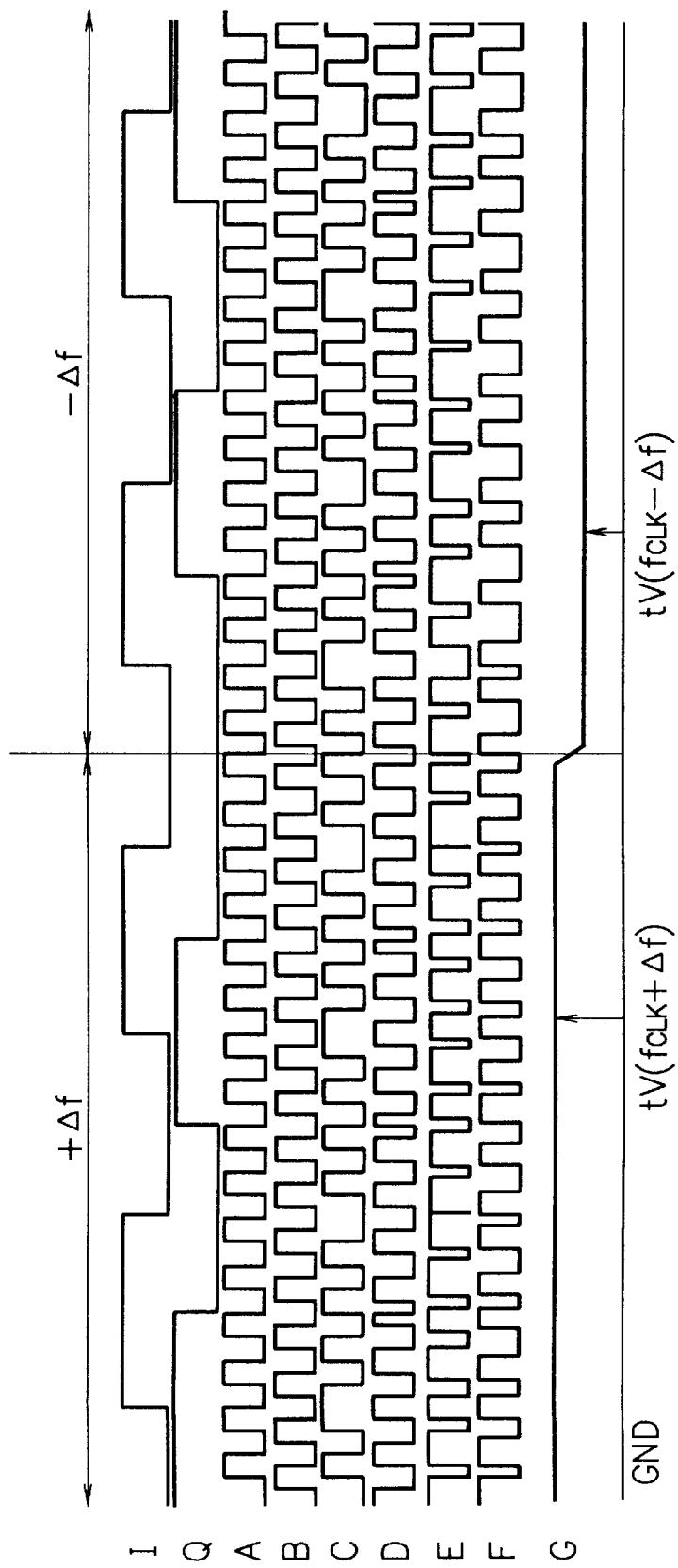
FIG. 10 is a timing chart of signals for describing an operation of the demodulating device illustrated in FIG. 9.

Referring to FIGS. 9 and 10, the description will proceed to a demodulating device according to a fourth embodiment of this invention. Similar parts are designated by like reference numerals. The demodulating device comprises the antenna 1, the high frequency amplifier 2, the orthogonal transforming circuit 3, an up-converting circuit 37, the pulse producing circuit 5, and the main low-pass filter 6. The up-converting circuit 37 is connected to the orthogonal transforming circuit 3. The pulse signal producing circuit 5 is connected to the up-converting circuit 37. The orthogonal transforming circuit 3 comprises the first local oscillator 7, the first phase shifter 8, the first mixer 9, the second mixer 10, the first low-pass filter 11, and the second low-pass filter 12.

The up-converting circuit 37 comprises the clock signal producing circuit 21, the phase converting circuit 22, the first EXOR circuit 23, the second EXOR circuit 24, and a mixing circuit 38. The phase converting circuit 22 is connected to the clock signal producing circuit 21. The first EXOR circuit 23 is connected to the first low-pass filter 11 and to phase converting circuit 22. The second EXOR circuit 24 is connected to the second low-pass filter 12 and to phase converting circuit 22.

The mixing circuit 38 comprises the NOT circuit 27 and a NAND circuit 39. The NOT circuit 27 is connected to the second EXOR circuit 24. The NOT circuit 27 inverts the second EXOR output signal to produce an inverted second EXOR output signal. The NAND circuit 39 is connected to the first EXOR circuit 23, to the NOT circuit 27 and to the pulse signal producing circuit 5. The NAND circuit 39 is supplied with the first EXOR output signal and the inverted second EXOR output signal to produce the up-converted signal. The NAND circuit 39 supplies the up-converted signal to the pulse signal producing circuit 5.

As shown in FIG. 9, it is assumed that the clock signal is represented by CLK, the first clock signal is represented by A, the second clock signal is represented by B, the first EXOR output signal is represented by C, the second EXOR output signal is represented by D, the up-converted signal is represented by E, the pulse signal is represented by F, and the demodulated signal is represented by G.

For example, the signals I, Q, CLK, A, B, C, D, E, F, and G are represented as shown in FIG. 10. A left section of FIG. 10 shows that a frequency deviation is equal to +Δf.

A right section of FIG. 10 shows that a frequency deviation is equal to −Δf.

Figure 11:
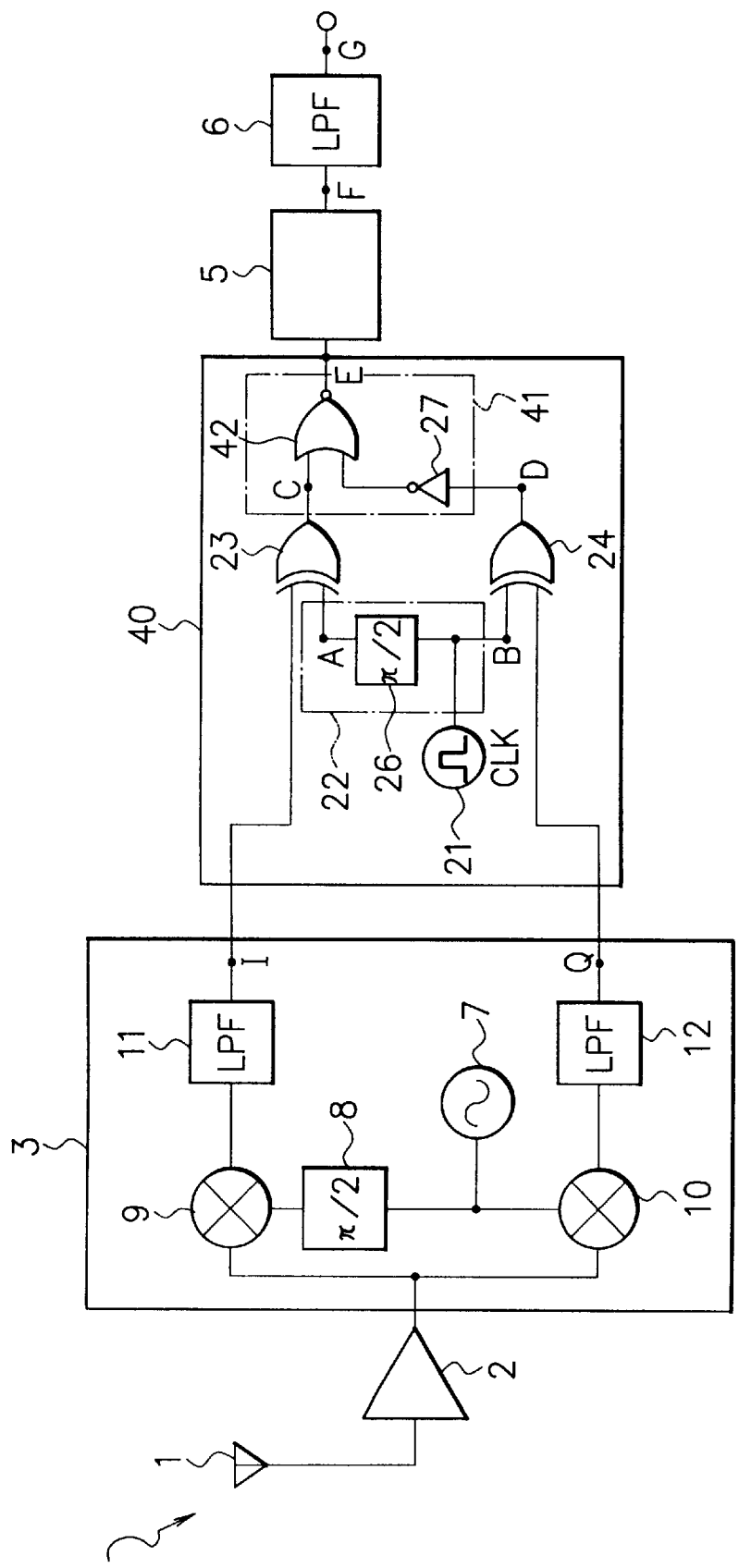
FIG. 11 is a block diagram of a demodulating device according to a fifth embodiment of this invention.
Figure 12:
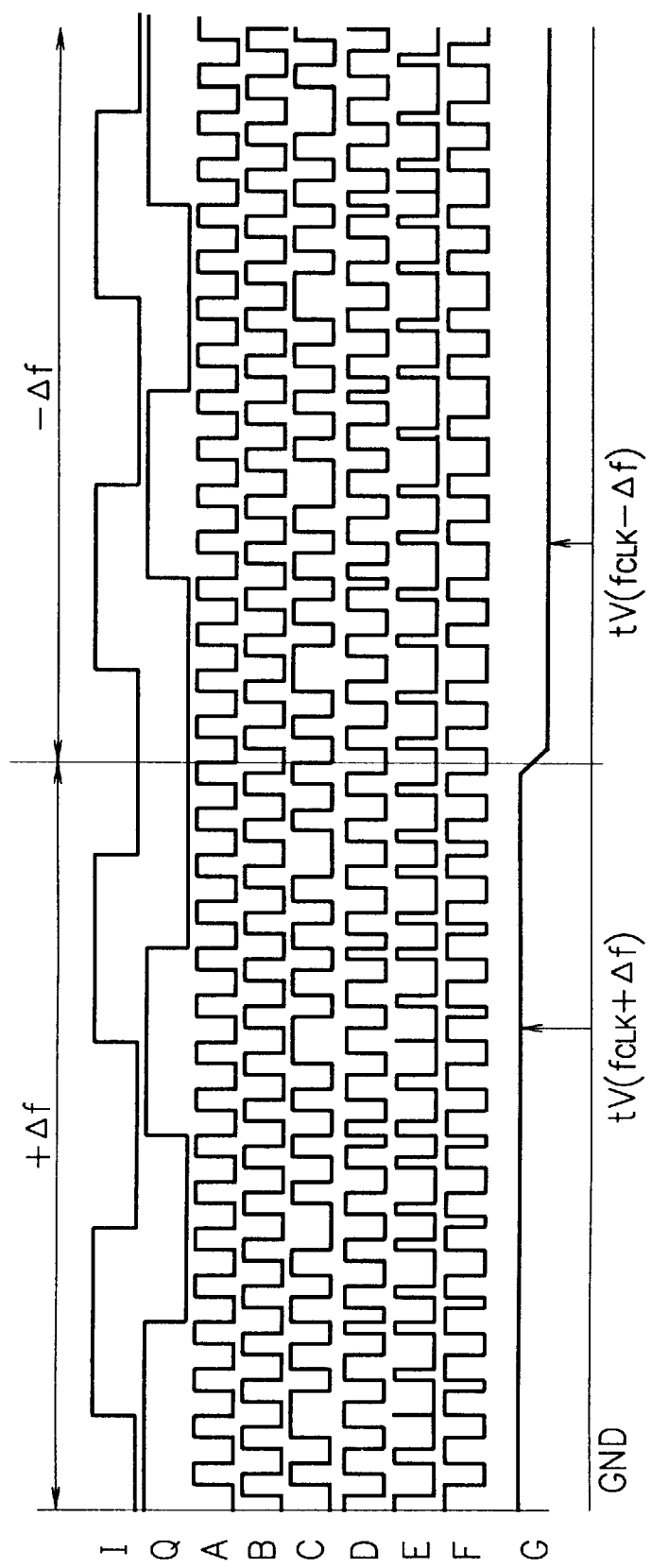
FIG. 12 is a timing chart of signals for describing an operation of the demodulating device illustrated in FIG. 11.

Referring to FIGS. 11 and 12, the description will proceed to a demodulating device according to a fifth embodiment of this invention. Similar parts are designated by like reference numerals. The demodulating device comprises the antenna 1, the high frequency amplifier 2, the orthogonal transforming circuit 3, an up-converting circuit 40, the pulse signal producing circuit 5, and the main low-pass filter 6. The up-converting circuit 40 is connected to the orthogonal transforming circuit 3. The pulse signal producing circuit 5 is connected to the up-converting circuit 40. The orthogonal transforming circuit 3 comprises the first local oscillator 7, the first phase shifter 8, the first mixer 9, the second mixer 10, the first low-pass filter 11, and the second low-pass filter 12.

The up-converting circuit 40 comprises the clock signal producing circuit 21, the phase converting circuit 22, the first EXOR circuit 23, the second EXOR circuit 24, and a mixing circuit 41. The phase converting circuit 22 is connected to the clock signal producing circuit 21. The first EXOR circuit 23 is connected to the first low-pass filter 11 and to phase converting circuit 22. The second EXOR circuit 24 is connected to the second low-pass filter 12 and to phase converting circuit 22.

The mixing circuit 41 comprises the NOT circuit 27 and a NOR circuit 42. The NOT circuit 27 is connected to the second EXOR circuit 24. The NOT circuit 27 inverts the second EXOR output signal to produce an inverted second EXOR output signal. The NOR circuit 42 is connected to the first EXOR circuit 23, to the NOT circuit 27, and to the pulse signal producing circuit 5. The NOR circuit 42 is supplied with the first EXOR output signal and the inverted second EXOR output signal to produce the up-converted signal. The NOR circuit 42 supplies the up-converted signal to the pulse signal producing circuit 5.

As shown in FIG. 11, it is assumed that the clock signal is represented by CLK, the first clock signal is represented by A, the second clock signal is represented by B, the first EXOR output signal is represented by C, the second EXOR output signal is represented by D, the up-converted signal is represented by E, the pulse signal is represented by F, and the demodulated signal is represented by G.

For example, the signals I, Q, CLK, A, B, C, D, E, F, and G are represented as shown in FIG. 12. A left section of FIG. 12 shows that a frequency deviation is equal to +Δf. A right section of FIG. 12 shows that a frequency deviation is equal to −Δf.

Figure 13:
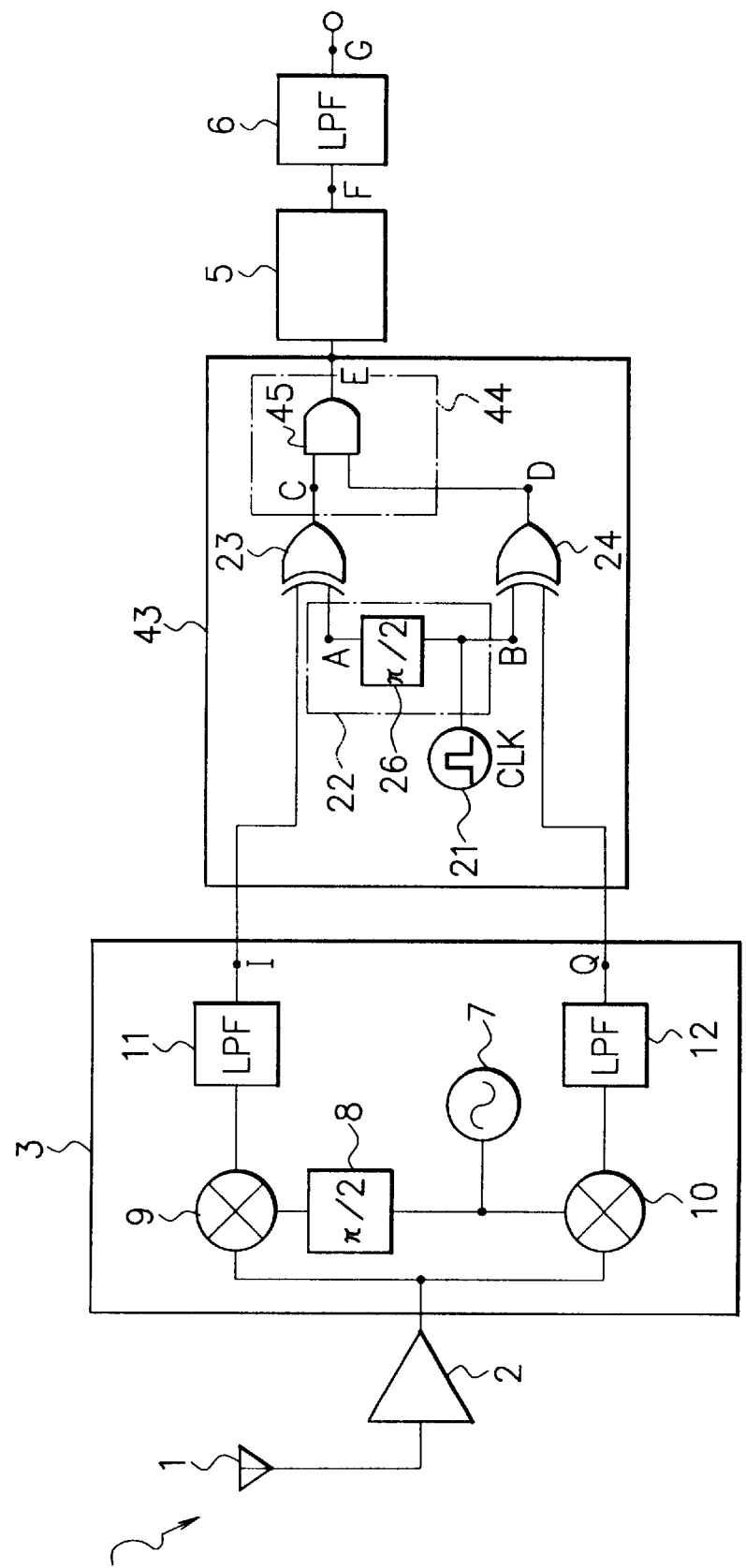
FIG. 13 is a block diagram of a demodulating device according to a sixth embodiment of this invention.
Figure 14:
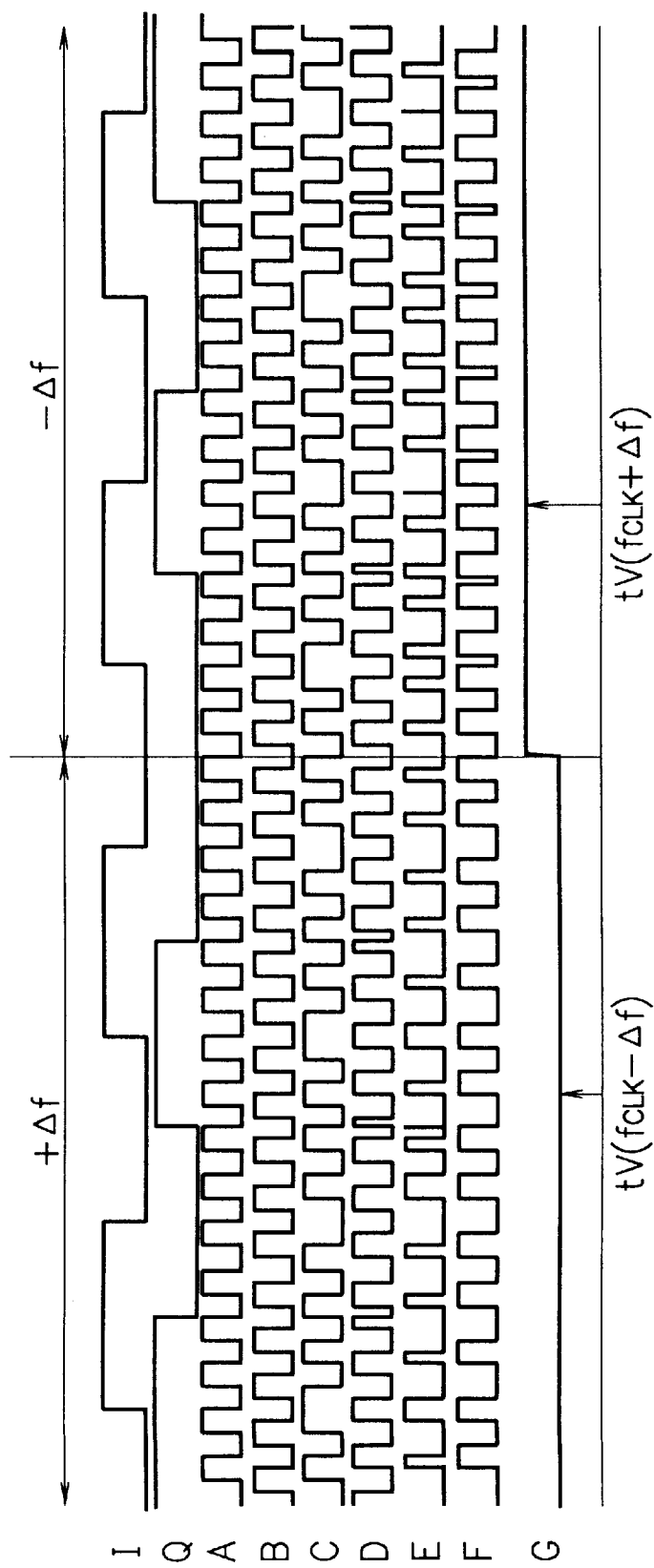
FIG. 14 is a timing chart of signals for describing an operation of the demodulating device illustrated in FIG. 13.

Referring to FIGS. 13 and 14, the description will proceed to a demodulating device according to a sixth embodiment of this invention. Similar parts are designated by like reference numerals. The demodulating device comprises the antenna 1, the high frequency amplifier 2, the orthogonal transforming circuit 3, an up-converting circuit 43, the pulse signal producing circuit 5, and the main low-pass filter 6. The up-converting circuit 43 is connected to the orthogonal transforming circuit 3. The pulse signal producing circuit 5 is connected to the up-converting circuit 43. The orthogonal transforming circuit 3 comprises the first local oscillator 7, the first phase shifter 8, the first mixer 9, the second mixer 10, the first low-pass filter 11, and the second low-pass filter 12.

The up-converting circuit 43 comprises the clock signal producing circuit 21, the phase converting circuit 22, the first EXOR circuit 23, the second EXOR circuit 24, and a mixing circuit 44. The phase converting circuit 22 is connected to the clock signal producing circuit 21. The first EXOR circuit 23 is connected to the first low-pass filter 11 and to phase converting circuit 22. The second EXOR circuit 24 is connected to the second low-pass filter 12 and to phase converting circuit 22.

The mixing circuit 44 comprises an AND circuit 45. The AND circuit 45 is connected to the first EXOR circuit 23, to the second EXOR circuit 24, and to the pulse signal producing circuit 5. The AND circuit 45 is supplied with the first EXOR output signal and the second EXOR output signal to produce the up-converted signal. The AND circuit 45 supplies the up-converted signal to the pulse signal producing circuit 5.

As shown in FIG. 13, it is assumed that the clock signal is represented by CLK, the first clock signal is represented by A, the second clock signal is represented by B, the first EXOR output signal is represented by C, the second EXOR output signal is represented by D, the up-converted signal is represented by E, the pulse signal is represented by F, and the demodulated signal is represented by G.

For example, the signals I, Q, CLK, A, B, C, D, E, D, F, and G are represented as shown in FIG. 14. A left section of FIG. 14 shows that a frequency deviation is equal to +Δf.

A right section of FIG. 14 shows that a frequency deviation is equal to −Δf.

Figure 15:
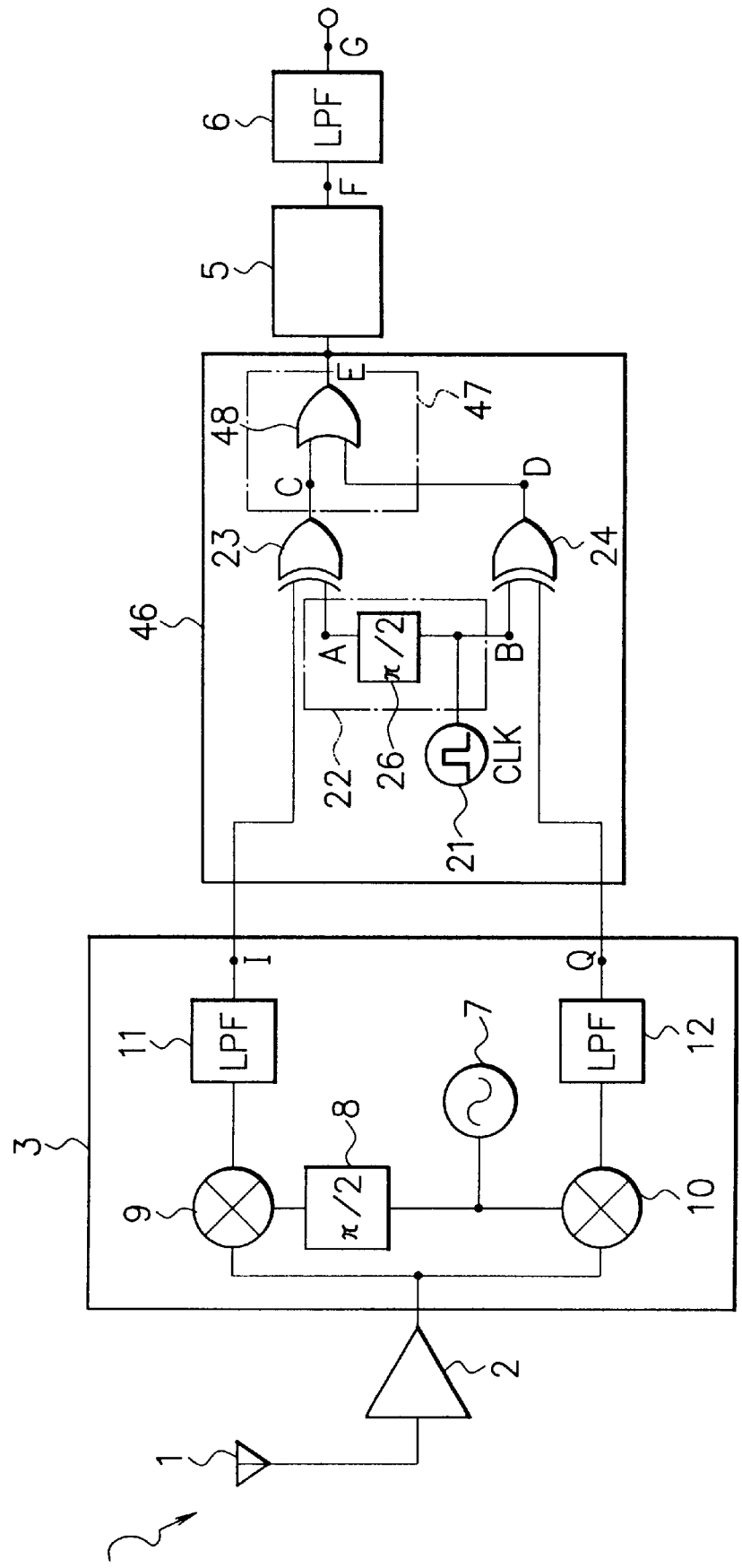
FIG. 15 is a block diagram of a demodulating device according to a seventh embodiment of this invention.
Figure 16:
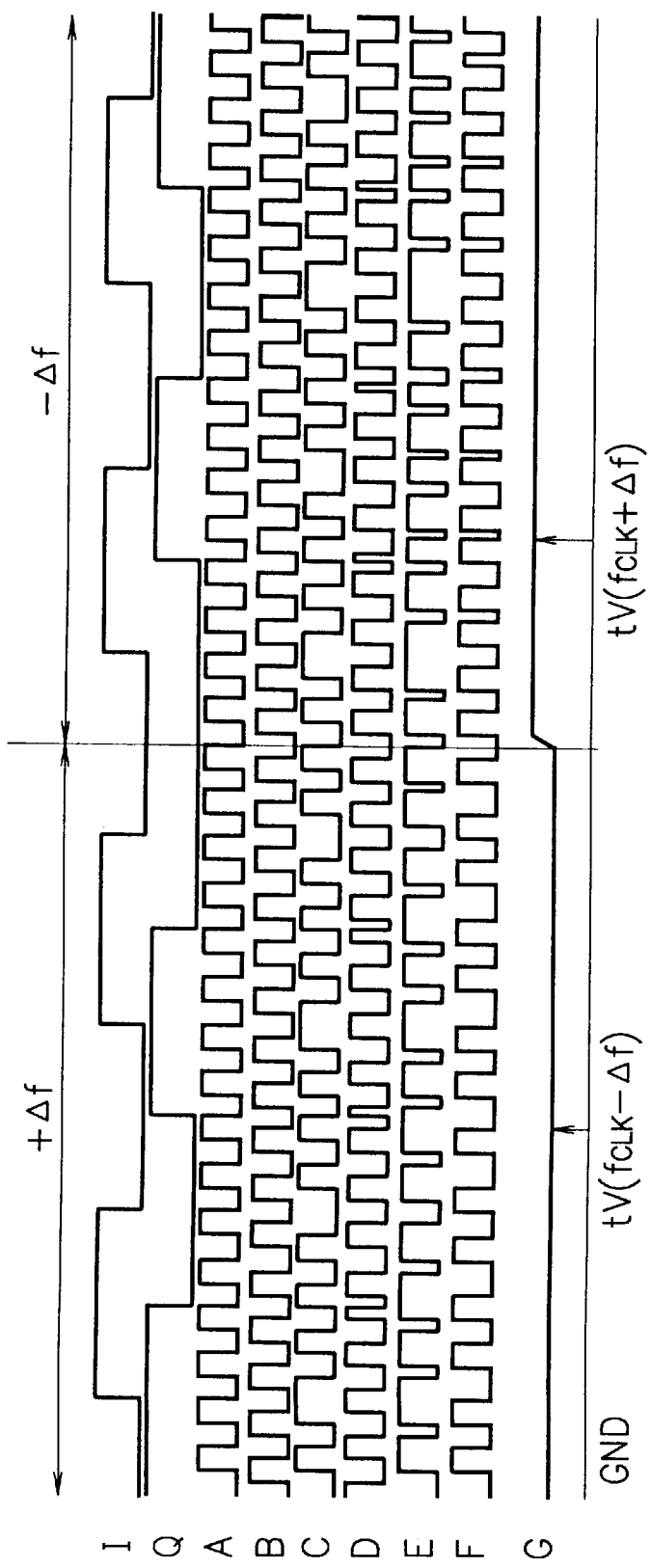
FIG. 16 is a timing chart of signals for describing an operation of the demodulating device illustrated in FIG. 15.

Referring to FIGS. 15 and 16, the description will proceed to a demodulating device according to a seventh embodiment of this invention. Similar parts are designated by like reference numerals. The demodulating device comprises the antenna 1, the high frequency amplifier 2, the orthogonal transforming circuit 3, an up-converting circuit 46, the pulse signal producing circuit 5, and the main low-pass filter 6. The up-converting circuit 46 is connected to the orthogonal transforming circuit 3. The pulse signal producing circuit 5 is connected to the up-converting circuit 46. The orthogonal transforming circuit 3 comprises the first local oscillator 7, the first phase shifter 8, the first mixer 9, the second mixer 10, the first low-pass filter 11, and the second low-pass filter 12.

The up-converting circuit 46 comprises the clock signal producing circuit 21, the phase converting circuit 22, the first EXOR circuit 23, the second EXOR circuit 24, and a mixing circuit 47. The phase converting circuit 22 is connected to the clock signal producing circuit 21. The first EXOR circuit 23 is connected to the first low-pass filter 11 and to phase converting circuit 22. The second EXOR circuit 24 is connected to the second low-pass filter 12 and to phase converting circuit 22.

The mixing circuit 47 comprises an OR circuit 48. The OR circuit 48 is connected to the first EXOR circuit 23, to the second EXOR circuit 24, and to the pulse signal producing circuit 5. The OR circuit 48 is supplied with the first EXOR output signal and the second EXOR output signal to produce the up-converted signal. The OR circuit 48 supplies the up-converted signal to the pulse signal producing circuit 5.

As shown in FIG. 15, it is assumed that the clock signal is represented by CLK, the first clock signal is represented by A, the second clock signal is represented by B, the first EXOR output signal is represented by C, the second EXOR output signal is represented by D, the up-converted signal is represented by E, the pulse signal is represented by F, and the demodulated signal is represented by G.

For example, the signals I, Q, CLK, A, B, C, D, E, F, and G are represented as shown in FIG. 16. A left section of FIG. 16 shows that a frequency deviation is equal to +Δf. A right section of FIG. 16 shows that a frequency deviation is equal to −Δf.

Figure 17:
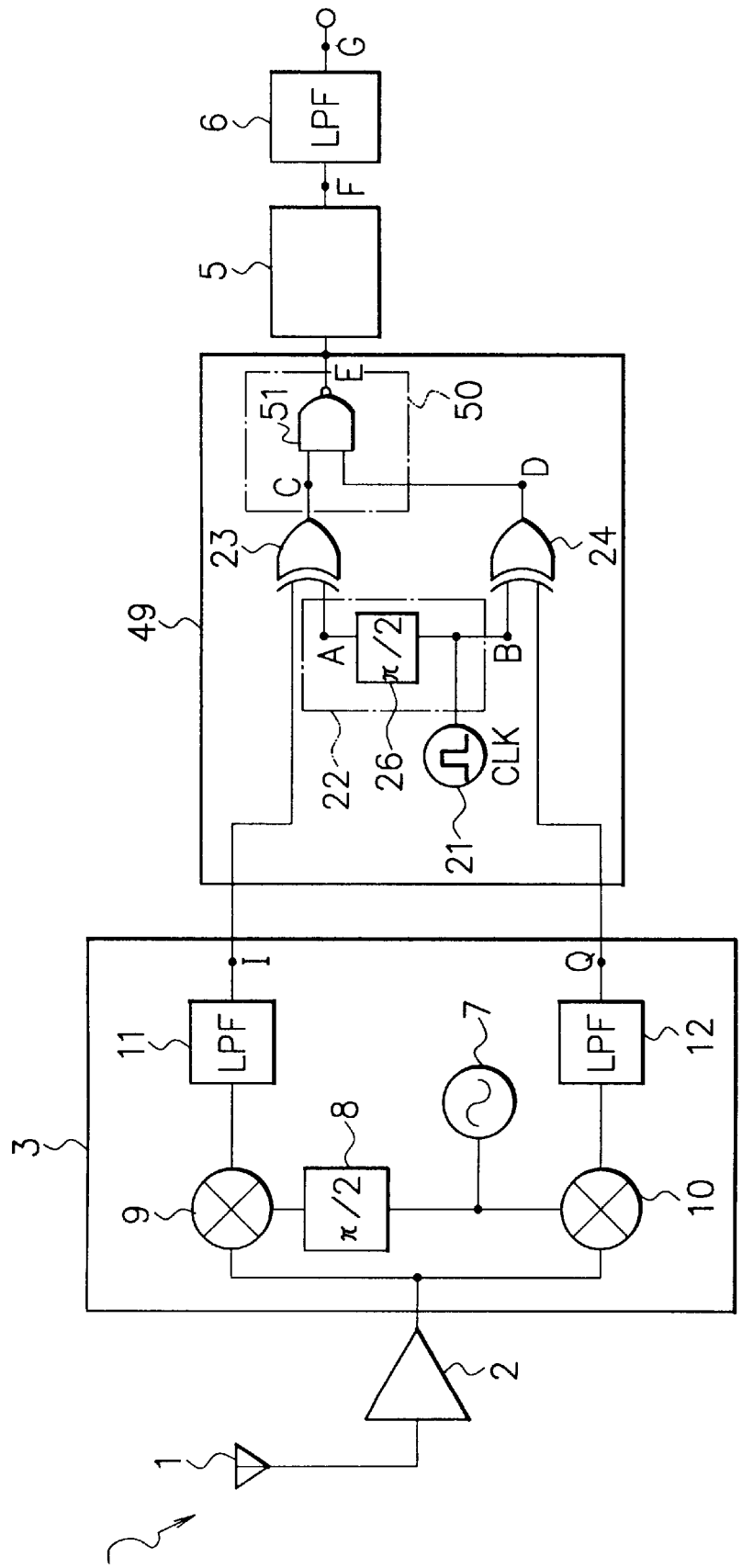
FIG. 17 is a block diagram of a demodulating device according to an eighth embodiment of this invention.
Figure 18:
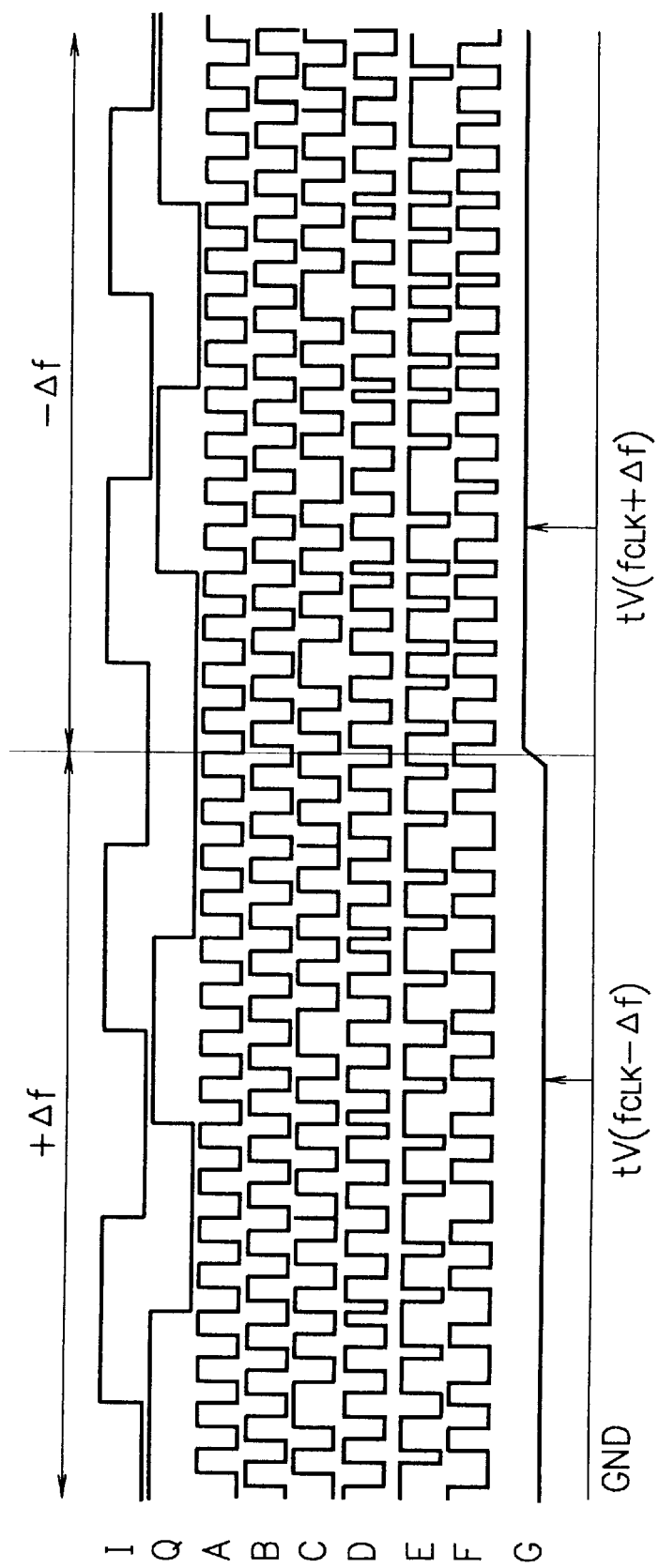
FIG. 18 is a timing chart of signals for describing an operation of the demodulating device illustrated in FIG. 17.

Referring to FIGS. 17 and 18, the description will proceed to a demodulating device according to an eighth embodiment of this invention. Similar parts are designated by like reference numerals. The demodulating device comprises the antenna 1, the high frequency amplifier 2, the orthogonal transforming circuit 3, an up-converting circuit 49, the pulse signal producing circuit 5, and the main low-pass filter 6. The up-converting circuit 49 is connected to the orthogonal transforming circuit 3. The pulse signal producing circuit 5 is connected to the up-converting circuit 49. The orthogonal transforming circuit 3 comprises the first local oscillator 7, the first phase shifter 8, the first mixer 9, the second mixer 10, the first low-pass filter 11, and the second low-pass filter 12.

The up-converting circuit 49 comprises the clock signal producing circuit 21, the phase converting circuit 22, the first EXOR circuit 23, the second EXOR circuit 24, and a mixing circuit 50. The phase converting circuit 22 is connected to the clock signal producing circuit 21. The first EXOR circuit 23 is connected to the first low-pass filter 11 and to phase converting circuit 22. The second EXOR circuit 24 is connected to the second low-pass filter 12 and to phase converting circuit 22.

The mixing circuit 50 comprises a NAND circuit 51. The NAND circuit 51 is connected to the first EXOR circuit 23, to the second EXOR circuit 24, and to the pulse signal producing circuit 5. The NAND circuit 51 is supplied with the first EXOR output signal and the second EXOR output signal to produce the up-converted signal. The NAND circuit 51 supplies the up-converted signal to the pulse signal producing circuit 5.

As shown in FIG. 17, it is assumed that the clock signal is represented by CLK, the first clock signal is represented by A, the second clock signal is represented by B, the first EXOR output signal is represented by C, the second EXOR output signal is represented by D, the up-converted signal is represented by E, the pulse signal is represented by F, and the demodulated signal is represented by G.

For example, the signals I, Q, CLK, A, B, C, D, E, F, and G are represented as shown in FIG. 18. A left section of FIG. 18 shows that a frequency deviation is equal to +Δf. A right section of FIG. 18 shows that a frequency deviation is equal to −Δf.

Figure 19:
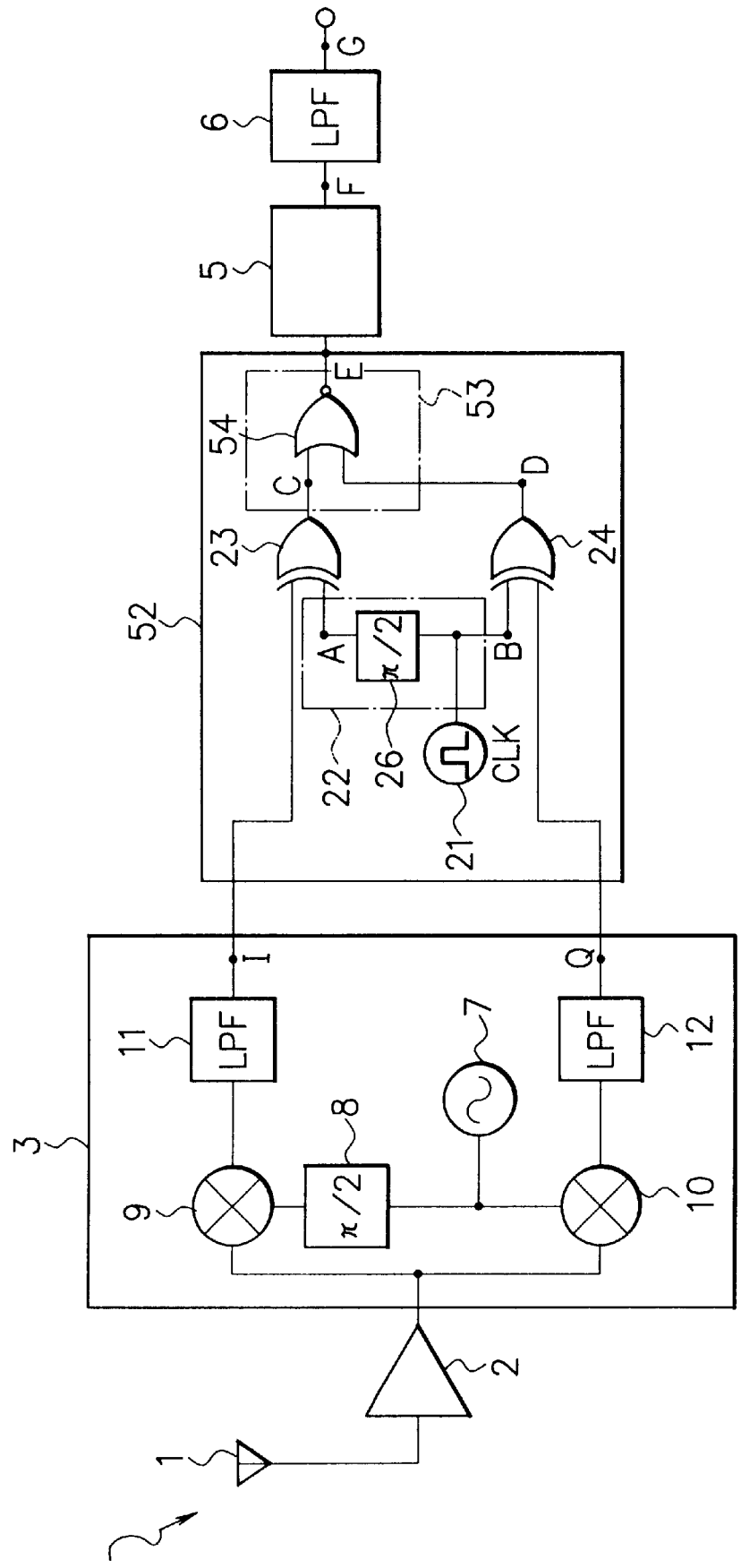
FIG. 19 is a block diagram of a demodulating device according to a ninth embodiment of this invention.

Referring to FIGS. 19 and 20, the description will proceed to a demodulating device according to a ninth embodiment of this invention. Similar parts are designated by like reference numerals. The demodulating device comprises the antenna 1, the high frequency amplifier 2, the orthogonal transforming circuit 3, an up-converting circuit 52, the pulse signal producing circuit 5, and the main low-pass filter 6. The up-converting circuit 52 is connected to the orthogonal transforming circuit 3. The pulse signal producing circuit 5 is connected to the up-converting circuit 52. The orthogonal transforming circuit 3 comprises the first local oscillator 7, the first phase shifter 8, the first mixer 9, the second mixer 10, the first low-pass filter 11, and the second low-pass filter 12.

The up-converting circuit 52 comprises the clock signal producing circuit 21, the phase converting circuit 22, the first EXOR circuit 23, the second EXOR circuit 24, and a mixing circuit 53. The phase converting circuit 22 is connected to the clock signal producing circuit 21. The first EXOR circuit 23 is connected to the first low-pass filter 11 and to phase converting circuit 22. The second EXOR circuit 24 is connected to the second low-pass filter 12 and to phase converting circuit 22.

The mixing circuit 53 comprises a NOR circuit 54. The NOR circuit 54 is connected to the first EXOR circuit 23, to the second EXOR circuit 24, and to the pulse signal producing circuit 5. The NOR circuit 54 is supplied with the first EXOR output signal and the second EXOR output signal to produce the up-converted signal. The NOR circuit 54 supplies the up-converted signal to the pulse signal producing circuit 5.

As shown in FIG. 19, it is assumed that the clock signal is represented by CLK, the first clock signal is represented by A, the second clock signal is represented by B, the first EXOR output signal is represented by C, the second EXOR output signal is represented by D, the up-converted signal is represented by E, the pulse signal is represented by F, and the demodulated signal is represented by G.

For example, the signals I, Q, CLK, A, B, C, D, E, F, and G are represented as shown in FIG. 20. A left section of FIG. 20 shows that a frequency deviation is equal to $+\Delta f$. A right section of FIG. 20 shows that a frequency deviation is equal to $-\Delta f$.

According to each of the second through ninth embodiments, the demodulating device is capable of increasing a frequency of detecting a phase of the received signal in a time like the first embodiment. Therefore, according to each of the second through ninth embodiments, the demodulating device is capable of increasing a speed of demodulation operation of the received signal. Also, according to each of the second through ninth embodiments, the demodulating device is capable of accommodating multilevel transmission like the first embodiment.

In addition, according to each of the second through ninth embodiments, the demodulating device comprises the up-converting circuit which has a few simple logical gate circuits like the first embodiment. Therefore, according to each of the second through ninth embodiments, the demodulating device comprises a small circuit and a small consumption power. Also, according to each of the second through ninth embodiments, the demodulating device is suited for integration of a circuit.

What is claimed is:

1. A demodulating device which comprises an orthogonal transforming circuit, an up-converting circuit, a pulse signal producing circuit, and a low-pass filter, said orthogonal transforming circuit being for orthogonally transforming a received frequency shift keying signal to produce a first base band signal and a second base band signal, said up-converting circuit being connected to said orthogonal transforming circuit and for mixing said first base band signal and said second base band signal to produce a mixed signal as an up-converted signal, said pulse signal producing circuit being connected to said up-converting circuit and for producing a pulse signal in response to said up-converted signal, said low-pass filter being connected to said pulse signal producing circuit for filtering said pulse signal to produce a filtered signal as a demodulated signal, said up-converting circuit comprising:

a clock signal producing circuit for producing a clock signal having a uniform periodic cycle;

a phase converting circuit connected to said clock signal producing circuit for converting said clock signal having the uniform periodic cycle to produce a first clock signal having a first phase and a second clock signal having a second phase;

a first EXOR circuit connected to said orthogonal transforming circuit and to said phase converting circuit for receiving said first base band signal and said first clock signal to produce a first EXOR output signal;

a second EXOR circuit connected to said orthogonal transforming circuit and to said phase converting circuit for receiving said second base band signal and said second clock signal to produce a second EXOR output signal; and a mixing circuit connected to said first EXOR circuit and to said second EXOR circuit for mixing said first EXOR output signal and said second EXOR output signal to produce said up-converted signal.

2. A demodulating device as claimed in claim 1, said phase converting circuit comprising a phase converter connected between said clock signal producing circuit and said first EXOR circuit for shifting a phase of said clock signal by $\pi/2$ to produce a shifted clock signal as said first clock signal, said phase converting circuit producing said clock signal as said second clock signal, said phase converting circuit supplying said first and second clock signals to said first and second EXOR circuits, respectively;

said mixing circuit comprising an inverter circuit and an AND circuit, said inverter circuit being connected to said second EXOR circuit and for inverting said second EXOR output signal to produce an inverted second EXOR output signal, said AND circuit being connected to said first EXOR circuit and to said inverter circuit and for receiving said first EXOR output signal and said inverted second EXOR output signal to produce said up-converted signal.

3. A demodulating device as claimed in claim 1, said phase converting circuit comprising an inverter circuit, a first T flip-flop, and a second T flip-flop, said inverter circuit being connected between said clock signal producing circuit and said first EXOR circuit and for inverting said clock signal to produce an inverted clock signal, said first T flip-flop being connected between said inverter circuit and said first EXOR circuit and for receiving said inverted clock signal to produce said first clock signal, said second T flip-flop being connected between said clock signal producing circuit and said second EXOR circuit and for receiving said clock signal to produce said second clock signal, said first and second T flip-flops supplying said first and second clock signals to said first and second EXOR circuits, respectively;

said mixing circuit comprising an inverter circuit and an AND circuit, said inverter circuit being connected to said second EXOR circuit and for inverting said second EXOR output signal to produce an inverted second EXOR output signal, said AND circuit being connected to said first EXOR circuit and to said inverter circuit and for receiving said first EXOR output signal and said inverted second EXOR output signal to produce said up-converted signal.

4. A demodulating device as claimed in claim 1, said phase converting circuit comprising a phase converter connected between said clock signal producing circuit and said first EXOR circuit for shifting a phase of said clock signal by $\pi/2$ to produce a shifted clock signal as said first clock signal, said phase converting circuit producing said clock signal as said second clock signal, said phase converting circuit supplying said first and second clock signals to said first and second EXOR circuits, respectively;

said mixing circuit comprising an inverter circuit and an OR circuit, said inverter circuit being connected to said second EXOR circuit and for inverting said second EXOR output signal to produce an inverted second EXOR output signal, said OR circuit being connected to said first EXOR circuit and to said inverter circuit and for receiving said first EXOR output signal and said inverted second EXOR output signal to produce said up-converted signal.

5. A demodulating device as claimed in claim 1, said phase converting circuit comprising a phase converter connected between said clock signal producing circuit and said first EXOR circuit for shifting a phase of said clock signal by $\pi/2$ to produce a shifted clock signal as said first clock signal, said phase converting circuit producing said clock signal as said second clock signal, said phase converting circuit supplying said first and second clock signals to said first and second EXOR circuits, respectively;

said mixing circuit comprising an inverter circuit and a NAND circuit, said inverter circuit being connected to said second EXOR circuit and for inverting said second EXOR output signal to produce an inverted second EXOR output signal, said NAND circuit being connected to said first EXOR circuit and to said inverter circuit and for receiving said first EXOR output signal and said inverted second EXOR output signal to produce said up-converted signal.

6. A demodulating device as claimed in claim 1, said phase converting circuit comprising a phase converter connected between said clock signal producing circuit and said first EXOR circuit for shifting a phase of said clock signal by $\pi/2$ to produce a shifted clock signal as said first clock signal, said phase converting circuit producing said clock signal as said second clock signal, said phase converting circuit supplying said first and second clock signals to said first and second EXOR circuits, respectively;

said mixing circuit comprising an inverter circuit and a NOR circuit, said inverter circuit being connected to said second EXOR circuit and for inverting said second EXOR output signal to produce an inverted second EXOR output signal, said NOR circuit being connected to said first EXOR circuit and to said inverter circuit and for receiving said first EXOR output signal and said inverted second EXOR output signal to produce said up-converted signal.

7. A demodulating device as claimed in claim 1, said phase converting circuit comprising a phase converter connected between said clock signal producing circuit and said first EXOR circuit for shifting a phase of said clock signal by $\pi/2$ to produce a shifted clock signal as said first clock signal, said phase converting circuit being for producing said clock signal as said second clock signal, said phase converting circuit being for supplying said first and second clock signals to said first and second EXOR circuits, respectively;

said mixing circuit comprising an AND circuit connected to said first EXOR circuit and to said second EXOR circuit for receiving said first EXOR output signal and said second EXOR output signal to produce said up-converted signal.

8. A demodulating device as claimed in claim 1, said phase converting circuit comprising a phase converter connected between said clock signal producing circuit and said first EXOR circuit for shifting a phase of said clock signal by $\pi/2$ to produce a shifted clock signal as said first clock signal, said phase converting circuit being for producing said clock signal as said second clock signal, said phase converting circuit being for supplying said first and second clock signals to said first and second EXOR circuits, respectively; said mixing circuit comprising an OR circuit connected to said first EXOR circuit and to said second EXOR circuit for receiving said first EXOR output signal and said second EXOR output signal to produce said up-converted signal.

9. A demodulating device as claimed in claim 1, said phase converting circuit comprising a phase converter connected between said clock signal producing circuit and said first EXOR circuit for shifting a phase of said clock signal by $\pi/2$ to produce a shifted clock signal as said first clock signal, said phase converting circuit being for producing said clock signal as said second clock signal, said phase converting circuit being for supplying said first and second clock signals to said first and second EXOR circuits, respectively;

said mixing circuit comprising a NAND circuit connected to said first EXOR circuit and to said second EXOR circuit for receiving said first EXOR output signal and said second EXOR output signal to produce said up-converted signal.

10. A demodulating device as claimed in claim 1, said phase converting circuit comprising a phase converter connected between said clock signal producing circuit and said first EXOR circuit for shifting a phase of said clock signal by $\pi/2$ to produce a shifted clock signal as said first clock signal, said phase converting circuit producing said clock signal as said second clock signal, said phase converting circuit supplying said first and second clock signals to said first and second EXOR circuits, respectively;

said mixing circuit comprising a NOR circuit connected to said first EXOR circuit and to said second EXOR circuit for receiving said first EXOR output signal and said second EXOR output signal to produce said up-converted signal.

11. A demodulating device comprising:

an orthogonal transforming circuit, an up-converting circuit, a pulse signal producing circuit, and a low-pass filter, said orthogonal transforming circuit orthogonally transforming a received frequency shift keying signal to produce a first base band signal and a second base band signal, said up-converting circuit connected to said orthogonal transforming circuit and for mixing said first base band signal and said second base band signal to produce a mixed signal as an up-converted signal, said pulse signal producing circuit connected to said up-converting circuit and producing a pulse signal in response to said up-converted signal, said low-pass filter being connected to said pulse signal producing circuit for filtering said pulse signal to produce a filtered signal as a demodulated signal, said up-converting circuit comprising:

a clock signal producing circuit that produces a clock signal having a uniform frequency;

a phase converting circuit connected to said clock signal producing circuit to convert said clock signal having the uniform frequency and to produce a first clock signal having a first phase and a second clock signal having a second phase, said first clock signal and said second clock signal both having the uniform frequency;

a first EXOR circuit connected to said orthogonal transforming circuit and to said phase converting circuit for receiving said first base band signal and said first clock signal to produce a first EXOR output signal;

a second EXOR circuit connected to said orthogonal transforming circuit and to said phase converting circuit for receiving said second base band signal and said second clock signal to produce a second EXOR output signal; and a mixing circuit connected to said first EXOR circuit and to said second EXOR circuit for mixing said first EXOR output signal and said second EXOR output signal to produce said up-converted signal.

12. A demodulating device as claimed in claim 11, said phase converting circuit comprising a phase converter connected between said clock signal producing circuit and said first EXOR circuit for shifting a phase of said clock signal by $\pi/2$ to produce a shifted clock signal as said first clock signal, said phase converting circuit producing said clock signal as said second clock signal, said phase converting circuit supplying said first and second clock signals to said first and second EXOR circuits, respectively;

said mixing circuit comprising an inverter circuit and an AND circuit, said inverter circuit being connected to said second EXOR circuit and for inverting said second EXOR output signal to produce an inverted second EXOR output signal, said AND circuit being connected to said first EXOR circuit and to said inverter circuit and for receiving said first EXOR output signal and said inverted second EXOR output signal to produce said up-converted signal.

13. A demodulating device as claimed in claim 11, said phase converting circuit comprising an inverter circuit, a first T flip-flop, and a second T flip-flop, said inverter circuit being connected between said clock signal producing circuit and said first EXOR circuit and for inverting said clock signal to produce an inverted clock signal, said first T flip-flop being connected between said inverter circuit and said first EXOR circuit and for receiving said inverted clock signal to produce said first clock signal, said second T flip-flop being connected between said clock signal producing circuit and said second EXOR circuit and for receiving said clock signal to produce said second clock signal, said first and second T flip-flops supplying said first and second clock signals to said first and second EXOR circuits, respectively;

said mixing circuit comprising an inverter circuit and an AND circuit, said inverter circuit being connected to said second EXOR circuit and for inverting said second EXOR output signal to produce an inverted second EXOR output signal, said AND circuit being connected to said first EXOR circuit and to said inverter circuit and for receiving said first EXOR output signal and said inverted second EXOR output signal to produce said up-converted signal.

14. A demodulating device as claimed in claim 11, said phase converting circuit comprising a phase converter connected between said clock signal producing circuit and said first EXOR circuit for shifting a phase of said clock signal by $\pi/2$ to produce a shifted clock signal as said first clock signal, said phase converting circuit producing said clock signal as said second clock signal, said phase converting circuit supplying said first and second clock signals to said first and second EXOR circuits, respectively;

said mixing circuit comprising an inverter circuit and an OR circuit, said inverter circuit being connected to said second EXOR circuit and for inverting said second EXOR output signal to produce an inverted second EXOR output signal, said OR circuit being connected to said first EXOR circuit and to said inverter circuit and for receiving said first EXOR output signal and said inverted second EXOR output signal to produce said up-converted signal.

15. A demodulating device as claimed in claim 11, said phase converting circuit comprising a phase converter connected between said clock signal producing circuit and said first EXOR circuit for shifting a phase of said clock signal by $\pi/2$ to produce a shifted clock signal as said first clock signal, said phase converting circuit producing said clock signal as said second clock signal, said phase converting circuit supplying said first and second clock signals to said first and second EXOR circuits, respectively;

said mixing circuit comprising an inverter circuit and a NAND circuit, said inverter circuit being connected to said second EXOR circuit and for inverting said second EXOR output signal to produce an inverted second EXOR output signal, said NAND circuit being connected to said first EXOR circuit and to said inverter circuit and for receiving said first EXOR output signal and said inverted second EXOR output signal to produce said up-converted signal.

16. A demodulating device as claimed in claim 11, said phase converting circuit comprising a phase converter connected between said clock signal producing circuit and said first EXOR circuit for shifting a phase of said clock signal by $\pi/2$ to produce a shifted clock signal as said first clock signal, said phase converting circuit producing said clock signal as said second clock signal, said phase converting circuit supplying said first and second clock signals to said first and second EXOR circuits, respectively;

said mixing circuit comprising an inverter circuit and a NOR circuit, said inverter circuit being connected to said second EXOR circuit and for inverting said second EXOR output signal to produce an inverted second EXOR output signal, said NOR circuit being connected to said first EXOR circuit and to said inverter circuit and for receiving said first EXOR output signal and said inverted second EXOR output signal to produce said up-converted signal.

17. A demodulating device as claimed in claim 11, said phase converting circuit comprising a phase converter connected between said clock signal producing circuit and said first EXOR circuit for shifting a phase of said clock signal by $\pi/2$ to produce a shifted clock signal as said first clock signal, said phase converting circuit producing said clock signal as said second clock signal, said phase converting circuit supplying said first and second clock signals to said first and second EXOR circuits, respectively;

said mixing circuit comprising an AND circuit connected to said first EXOR circuit and to said second EXOR circuit for receiving said first EXOR output signal and said second EXOR output signal to produce said up-converted signal.

18. A demodulating device as claimed in claim 11, said phase converting circuit comprising a phase converter connected between said clock signal producing circuit and said first EXOR circuit for shifting a phase of said clock signal by $\pi/2$ to produce a shifted clock signal as said first clock signal, said phase converting circuit producing said clock signal as said second clock signal, said phase converting circuit supplying said first and second clock signals to said first and second EXOR circuits, respectively;

said mixing circuit comprising an OR circuit connected to said first EXOR circuit and to said second EXOR circuit for receiving said first EXOR output signal and said second EXOR output signal to produce said up-converted signal.

19. A demodulating device as claimed in claim 11, said phase converting circuit comprising a phase converter connected between said clock signal producing circuit and said first EXOR circuit for shifting a phase of said clock signal by $\pi/2$ to produce a shifted clock signal as said first clock signal, said phase converting circuit producing said clock signal as said second clock signal, said phase converting circuit supplying said first and second clock signals to said first and second EXOR circuits, respectively;

said mixing circuit comprising a NAND circuit connected to said first EXOR circuit and to said second EXOR circuit for receiving said first EXOR output signal and said second EXOR output signal to produce said up-converted signal.

20. A demodulating device as claimed in claim 11, said phase converting circuit comprising a phase converter connected between said clock signal producing circuit and said first EXOR circuit for shifting a phase of said clock signal by $\pi/2$ to produce a shifted clock signal as said first clock signal, said phase converting circuit producing said clock signal as said second clock signal, said phase converting circuit supplying said first and second clock signals to said first and second EXOR circuits, respectively;

said mixing circuit comprising a NOR circuit connected to said first EXOR circuit and to said second EXOR circuit for receiving said first EXOR output signal and said second EXOR output signal to produce said up-converted signal.

* * * * *